(12) United States Patent
Yamamoto et al.

(10) Patent No.: US 8,542,188 B2
(45) Date of Patent: Sep. 24, 2013

(54) POINTING INPUT DEVICE, POINTING CONTROL DEVICE, POINTING CONTROL SYSTEM, AND POINTING CONTROL METHOD

(75) Inventors: Kazuyuki Yamamoto, Kanagawa (JP); Kunihito Sawai, Kanagawa (JP)

(73) Assignee: Sony Corporation, Tokyo (JP)

( * ) Notice: Subject to any disclaimer, the term of this patent is extended or adjusted under 35 U.S.C. 154(b) by 1003 days.

(21) Appl. No.: 12/467,766

(22) Filed: May 18, 2009

(65) Prior Publication Data

US 2009/0295721 A1 Dec. 3, 2009

(30) Foreign Application Priority Data

Jun. 2, 2008 (JP) ................. 2008-144576

(51) Int. Cl.
*G06F 3/033* (2006.01)
*G09G 5/08* (2006.01)

(52) U.S. Cl.
USPC ......................................................... 345/158

(58) Field of Classification Search
None
See application file for complete search history.

(56) References Cited

U.S. PATENT DOCUMENTS

| | | | |
|---|---|---|---|
| 5,453,758 A | 9/1995 | Sato | |
| 2004/0090423 A1* | 5/2004 | Bisset | ............................ 345/169 |
| 2005/0212750 A1* | 9/2005 | Marvit et al. | .................. 345/156 |
| 2005/0212767 A1* | 9/2005 | Marvit et al. | .................. 345/158 |
| 2005/0253806 A1* | 11/2005 | Liberty et al. | ................. 345/156 |

FOREIGN PATENT DOCUMENTS

| | | | |
|---|---|---|---|
| JP | 10-149252 | | 6/1998 |
| JP | 10149252 A | * | 6/1998 |
| JP | 11-085387 | | 3/1999 |
| JP | 11085387 A | * | 3/1999 |
| JP | 2001-056743 | | 2/2001 |
| JP | 2001056743 A | * | 2/2001 |
| JP | 3506878 | | 12/2003 |
| JP | 3748483 | | 12/2005 |
| JP | 3748483 B | * | 2/2006 |

* cited by examiner

*Primary Examiner* — Alexander S Beck
*Assistant Examiner* — Kirk Hermann
(74) *Attorney, Agent, or Firm* — K&L Gates LLP

(57) ABSTRACT

An input apparatus is provided, and includes: a main body operated by a user in a first operation form of pointing a predetermined position on a screen using a pointer on the screen and a second operation form different from the first operation form. The input apparatus includes an operation form detection section to detect which of the first operation form and the second operation form an operation form of the main body is; a movement detection section to detect a movement of the mail body. The input apparatus includes an operational section to switch a first operational mode corresponding to the first operation form and a second operational mode corresponding to the second operation form therebetween according to the operation form of the main body, and calculating a corresponding movement value corresponding to the movement of the pointer on the screen that corresponds to the detected movement of the main body.

7 Claims, 42 Drawing Sheets

POINTING INPUT DEVICE, POINTING CONTROL DEVICE, POINTING CONTROL SYSTEM, AND POINTING CONTROL METHOD

CROSS REFERENCES TO RELATED APPLICATIONS

The present application claims priority to that disclosed in Japanese Priority Patent Application JP 2008-144576 filed in the Japan Patent Office on Jun. 2, 2008, the entire contents of which is hereby incorporated by reference.

BACKGROUND

The present application relates to an input apparatus for operating a GUI (Graphical User Interface), a control apparatus for controlling the GUI based on information output from the input apparatus, a control system including those apparatuses, and a control method therefor.

Pointing devices, particularly a mouse and a touchpad, are used as controllers for GUIs widely used in PCs (Personal Computers). Not just as HIs (Human Interfaces) of PCs as in related art, the GUIs are now starting to be used as an interface for AV equipment and game devices used in living rooms etc. with, for example, televisions as image media. Various pointing devices that a user is capable of operating 3-dimensionally are proposed as controllers for the GUIs of this type (see, for example, Japanese Patent Application Laid-open No. 2001-56743 and Japanese Patent No. 3,748,483).

Because the pointing devices of these types are operated 3-dimensionally, hand movements become a problem. For correcting hand movements, there is means for removing, from output signals of sensors that detect an operational movement of a user, a frequency corresponding to the hand movement using a band limiter (see, for example, Japanese Patent No. 3,506,878 (paragraphs [0060] and [0062]); hereinafter, referred to as Patent Document 3). Patent Document 3 discloses an example where the band limiter removes frequencies ranging from 0.5 to 15 Hz, for example.

There are other operation methods for pointing devices. For example, there is disclosed an example where letters are input by a user moving a pen-type input apparatus while holding it like a pen (see, for example, patent Document 3).

As described above, there are various operation forms for a pointing device. Therefore, it is considered that there are suitable relationships between a velocity of the pointing device and a velocity of a pointer on a screen that a user feels higher operability depending on the operation form.

In view of the circumstances as described above, there is a need for an easy-to-operate input apparatus, control apparatus, control system, and control method that suit operation forms of the input apparatus such as a pointing device.

There is also a need for an input apparatus, a control apparatus, a control system, and a control method with which an operational feeling that satisfies each user when a plurality of users use the input apparatus can be obtained.

SUMMARY

According to an embodiment, there is provided an input apparatus including a main body, an operation form detection means, a movement detection means, and an operation means. The main body is operated by a user in a first operation form of pointing a predetermined position on a screen using a pointer on the screen and a second operation form different from the first operation form. The operation form detection means detects which of the first operation form and the second operation form an operation form of the main body is. The movement detection means detects a movement of the main body. The operation means selectively switches a first operational mode corresponding to the first operation form to a second operational mode corresponding to the second operation form and vice versa according to the operation form of the main body detected by the operation form detection means, and calculates a corresponding movement value corresponding to the movement of the pointer on the screen, the movement of the pointer corresponding to the detected movement of the main body.

Because the operation means uses operational modes respectively corresponding to the first operation form and the second operation form to calculate the corresponding movement value, an operational feeling that matches the first and second operation forms can be obtained.

The corresponding movement value is a velocity value, an acceleration value, or a movement amount for moving the pointer on the screen.

The first operation form may be an operation form in which the user points the predetermined position on the screen by moving the main body 3-dimensionally.

The second operation form may be an operation form for a manual input made by the user moving the main body. Letters, figures, symbols, signs, and the like are input through the manual input operation.

The operation means may calculate a velocity-related value corresponding to the movement of the main body, attenuate an output value of a predetermined frequency range out of an output value as the calculated velocity-related value by a scale factor of a first scale profile set in accordance with the velocity-related value, and calculate the attenuated output value as the corresponding movement value, and the first scale profile may be differed between a case where the first operational mode is used and a case where the second operational mode is used.

Because the operation means attenuates the output value of a signal of a predetermined frequency, a value of the scale factor becomes smaller than 1. The predetermined frequency range is as frequency range that corresponds to a hand movement. Thus, it becomes possible for the user to perform accurate pointing operations with the pointer on the screen even when a vibration including a hand movement occurs in the main body. Moreover, because the scale factor is controlled appropriately in accordance with the movement of the input apparatus, the user can operate the input apparatus without feeling a phase delay as a characteristic of an attenuation function, for example.

The velocity-related value is a velocity value or an angular velocity value.

The movement detection means may include at least one of an acceleration sensor and an angular velocity sensor. When the movement detection means includes the acceleration sensor, the velocity value as the velocity-related value may be calculated based on an acceleration value of the main body obtained by the acceleration sensor. When the movement detection means includes the angular velocity sensor, the velocity value may be obtained by an operation that is based on an angular velocity value of the main body obtained by the angular velocity sensor, or the velocity value stored in a memory or the like may be read out using a lookup table on angular velocity values and velocity values.

In the first operational mode, the operation means may control the scale factor so that, until the velocity-related value reaches a first threshold value, the scale factor gradually decreases as the velocity-related value increases, and control the scale factor so that, until the velocity-related value that has exceeded the first threshold value reaches a second threshold value larger than the first threshold value, the scale factor gradually increases as the velocity-related value increases. It is considered that regarding a range of the velocity-related value equal to or smaller than the first threshold value in which hand movements are apt to occur, when the velocity-related value is within a range from a value close to 0 to the first threshold value, a hand movement amount increases along with the velocity-related value. Therefore, since the scale factor gradually decreases as the velocity-related value increases in this range, awkwardness in operation for the user can be eliminated. Further, it is considered that the hand movement amount becomes smaller as the velocity-related value increases after reaching the first threshold value. Therefore, by the scale factor gradually increasing until the velocity-related value that has exceeded the first threshold value reaches the second threshold value, awkwardness in operation for the user can be eliminated.

The term "gradually" means "practically successively", "step-wise", or a combination of those.

The operation means may further include a storage means capable of storing a predetermined number of velocity-related values that are temporally consecutive and a judgment means for judging whether signs of the predetermined number of stored velocity-related values are the same. When the signs of the predetermined number of velocity-related values are the same, the attenuation function of the output means may be stopped or the scale factor may be controlled so as to weaken the attenuation function.

The movement detection means may include an acceleration detection means for detecting an acceleration value corresponding to the movement of the main body, and the operation means may control the scale factor based on the detected acceleration value.

The operation means may calculate a velocity-related value corresponding to the movement of the main body and multiply, in both cases where the first operational mode is used and the second operational mode is used, the velocity-related value that has been output by a scale factor of a second scale profile set in accordance with the velocity-related value, to thus calculate the corresponding movement value. The second scale profile may be differed between the case where the first operational mode is used and the case where the second operational mode is used. The second scale profile is the same as the first scale profile in terms of being set in accordance with the velocity-related value, but does not target an output value of a predetermined frequency like the first scale profile.

In the first operational mode, the operation means may variably control the scale factor of the second scale profile when the output velocity-related value is within a first range between the first threshold value and the second threshold value larger than the first threshold value, and control the scale factor of the second scale profile to be constant when the output velocity-related value is within a second range exceeding the second threshold value. The first threshold value may be set to 0 or a value larger than 0.

The operation means may control the scale factor of the second scale profile so that the scale factor of the second scale profile increases as the velocity-related value increases in the first range.

The operation means may control the scale factor to be constant when the calculated velocity-related value is within a third range between 0 and the first threshold value. Accordingly, because the movement of the pointer becomes linear in accordance with an operation at a time the main body is started moving (instant when the main body starts moving), the pointer starts to move smoothly.

The operation form detection means may be a mechanical switch provided to the main body. Alternatively, in a case where the operation form detection means is provided to a control apparatus, the operation form detection means may include means for outputting screen data including a first area and a second area, and means for judging that the main body is operated in the first operation form when the pointer is positioned inside the first area and judging that the main body is operated in the second operation form when the pointer is positioned inside the second area.

The operation means may calculate, as the corresponding movement value, a first corresponding movement value along a first axis on the screen and a second corresponding movement value along a second axis different from the first axis, the movement detection means may include an acceleration sensor to detect a first acceleration value in a first direction of the main body corresponding to the first axis and a second acceleration value in a second direction of the main body different from the first direction, the second direction corresponding to the second axis, and the operation form detection means may detect that the first operation form has been switched to the second operation form as the operation form for a manual input when an absolute value of both the first acceleration value and the second acceleration value that have been detected is equal to or smaller than a threshold value. In other words, the first operation form is switched to the second operation form and vice versa due to a positional change of the main body.

The value to be the target of the threshold-value judgment is not limited to the absolute values of the first acceleration value and the second acceleration value. For example, the value may be a combined vector amount of the first acceleration value and the second acceleration value, or other operational values.

The operation means may calculate, as the corresponding movement value, a first corresponding movement value along a first axis on the screen and a second corresponding movement value along a second axis different from the first axis, the movement detection means may include an acceleration sensor to detect a first acceleration value in a first direction of the main body corresponding to the first axis, a second acceleration value in a second direction of the main body different from the first direction, the second direction corresponding to the second axis, and a third acceleration value in a third direction of the main body different from both the first direction and the second direction, and the operation form detection means may detect that the first operation form has been switched to the second operation form as the operation form for a manual input when an absolute value of the detected third acceleration value exceeds a threshold value.

The main body may include an enter button that is pressed by the user for inputting an enter code, and the operation form detection means may detect that the first operation form has been switched to the second operation form as the operation form for a manual input when the enter button is pressed and the enter code is thus input. The manual input operation is carried out as a drag operation in many cases. Therefore, as long as the switch of the operation form is detected when a drag operation is made, no additional hardware or the like for detecting a switch becomes necessary.

According to an embodiment, there is provided a control apparatus controlling a movement of a pointer on a screen based on information on a velocity-related value output from an input apparatus including a main body operated by a user in a first operation form of pointing a predetermined position on the screen using the pointer on the screen and a second operation form different from the first operation form, an operation form detection means for detecting which of the first operation form and the second operation form an operation form of the main body is, a movement detection means for detecting a movement of the main body, and a velocity-related value calculation means for calculating the velocity-related value that is related to a velocity of the detected movement of the main body. In this case, the control apparatus includes a reception means and an operation means. The reception means receives the information on the velocity-related value. The operation means switches a first operational mode corresponding to the first operation form to a second operational mode corresponding to the second operation form and vice versa according to the operation form of the main body detected by the operation form detection means, and calculates, based on the received information on the velocity-related value, a corresponding movement value corresponding to the movement of the pointer on the screen, the movement of the pointer corresponding to the movement of the main body.

According to another embodiment, there is provided a control apparatus controlling a movement of a pointer on a screen based on information on a detection value output from an input apparatus including a main body operated by a user in a first operation form of pointing a predetermined position on the screen using the pointer on the screen and a second operation form different from the first operation form, an operation form detection means for detecting which of the first operation form and the second operation form an operation form of the main body is, a movement detection means for detecting a movement of the main body, and an output means for outputting the detection value that has been detected. In this case, the control apparatus includes a reception means and an operation means. The reception means receives the information on the detection value. The operation means calculates a velocity-related value that is related to a velocity of the movement of the main body based on the received detection value, switches a first operational mode corresponding to the first operation form to a second operational mode corresponding to the second operation form and vice versa according to the operation form of the main body detected by the operation form detection means, and calculates, based on information on the calculated velocity-related value, a corresponding movement value corresponding to the movement of the pointer on the screen, the movement of the pointer corresponding to the movement of the main body.

According to another embodiment, there is provided a control apparatus controlling a movement of a pointer on a screen based on information on a velocity-related value output from an input apparatus including a main body operated by a user in a first operation form of pointing a predetermined position on the screen using the pointer on the screen and a second operation form different from the first operation form, a movement detection means for detecting a movement of the main body, and a velocity-related value calculation means for calculating the velocity-related value that is related to a velocity of the detected movement of the main body. In this case, the control apparatus includes a reception means, an operation form detection means, and an operation means. The reception means receives the information on the velocity-related value. The operation form detection means detects which of the first operation form and the second operation form an operation form of the main body is. The operation means switches a first operational mode corresponding to the first operation form to a second operational mode corresponding to the second operation form and vice versa according to the operation form of the main body detected by the operation form detection means, and calculates, based on the received information on the velocity-related value, a corresponding movement value corresponding to the movement of the pointer on the screen, the movement of the pointer corresponding to the movement of the main body.

According to an embodiment, there is provided a control system including an input apparatus and a control apparatus. The input apparatus includes a main body, an operation form detection means, a movement detection means, an operation means, and an output means. The main body is operated by a user in a first operation form of pointing a predetermined position on a screen using a pointer on the screen and a second operation form different from the first operation form. The operation form detection means detects which of the first operation form and the second operation form an operation form of the main body is. The movement detection means detects a movement of the main body. The operation means switches a first operational mode corresponding to the first operation form to a second operational mode corresponding to the second operation form and vice versa according to the operation form of the main body detected by the operation form detection means, and calculates a corresponding movement value corresponding to the movement of the pointer on the screen, the movement of the pointer corresponding to the detected movement of the main body. The output means outputs information on the calculated corresponding movement value. The control apparatus includes a reception means and a coordinate value generation means. The reception means receives the output information on the corresponding movement value. The coordinate value generation means generates coordinate values of the pointer on the screen in accordance with the received corresponding movement value.

According to an embodiment, there is provided a control method including: detecting a movement of a main body of an input apparatus; detecting which of a first operation form in which a user points a predetermined position on a screen using a pointer on the screen and a second operation form different from the first operation form an operation form of the main body is; and switching a first operational mode corresponding to the first operation form to a second operational mode corresponding to the second operation form and vice versa according to the detected operation form of the main body, and calculating a corresponding movement value corresponding to a movement of the pointer on the screen, the movement of the pointer corresponding to the detected movement of the main body.

According to another embodiment, there is provided an input apparatus including a main body, a movement detection means, a velocity-related value calculation means, an output means, a storage means, and an output control means. The movement detection means detects a movement of the main body. The velocity-related value calculation means calculates a velocity-related value that is related to a velocity of the detected movement of the main body. The output means attenuates an output value of a predetermined frequency range out of an output value as the calculated velocity-related value by a scale factor of a scale profile set in accordance with the velocity-related value, and outputs the attenuated output value as a corresponding movement value that corresponds to a movement of a pointer on a screen. The storage means stores a plurality of pieces of identification information for identifying a plurality of users and information on the scale profile set for each of the plurality of pieces of identification information in association with each other. The output control means controls the output means to output, when one of the plurality of pieces of identification information is selected by one of the plurality of users, the corresponding movement value based on the information on the scale profile that corresponds to the selected identification information out of the plurality of pieces of information on the scale profile.

Accordingly, in a case where a plurality of users use the input apparatus, an operational feeling that satisfies each user can be obtained.

The storage means may store, as information on a gesture operation that corresponds to the movement of the main body, at least one piece of identification information out of the plurality of pieces of identification information.

According to another embodiment, there is provided a control apparatus controlling a movement of a pointer on a screen based on an output value as a velocity-related value output from an input apparatus including a main body, a movement detection means for detecting a movement of the main body, and a velocity-related value calculation means for calculating the velocity-related value that is related to a velocity of the detected movement of the main body. In this case, the control apparatus includes a reception means, an output means, a storage means, and an output control means. The reception means receives the output value that has been output. The output means attenuates an output value of a predetermined frequency range out of the received output value as the velocity-related value by a scale factor of a scale profile set in accordance with the velocity-related value, and outputs the attenuated output value as a corresponding movement value that corresponds to the movement of the pointer on the screen. The storage means stores a plurality of pieces of identification information for identifying a plurality of users and information on the scale profile set for each of the plurality of pieces of identification information in association with each other. The output control means controls the output means to output, when one of the plurality of pieces of identification information is selected by one of the plurality of users, the corresponding movement value based on the information on the scale profile corresponding to the selected identification information out of the plurality of pieces of information on the scale profile.

According to another embodiment, there is provided a control method including: detecting a movement of a main body of an input apparatus; calculating a velocity-related value that is related to a velocity of the detected movement of the main body; attenuating, by an output means, an output value of a predetermined frequency range out of an output value as the calculated velocity-related value by a scale factor of a scale profile set in accordance with the velocity-related value, and outputting the attenuated output value as a corresponding movement value that corresponds to a movement of a pointer on a screen; storing a plurality of pieces of identification information for identifying a plurality of users and information on the scale profile set for each of the plurality of pieces of identification information in association with each other; and controlling the output means to output, when one of the plurality of pieces of identification information is selected by one of the plurality of users, the corresponding movement value based on the information on the scale profile corresponding to the selected identification information out of the plurality of pieces of information on the scale profile.

According to another embodiment, there is provided an input apparatus including a main body, a movement detection means, an operation section, an output means, a stop means, a storage means, and a time control means. The movement detection means detects a movement of the main body. The operation section is operated by a user. The output means outputs a movement command for moving a pointer on a screen, that corresponds to the detected movement of the main body, and outputs, when input with an operation signal that is unrelated to the movement of the main body by an operation to the operation section, an operation command corresponding to the input operation signal. The stop means stops the movement of the pointer on the screen during a predetermined stop time period since one of the input of the operation signal and a cancel of the input of the operation signal. The storage means stores a plurality of pieces of identification information for identifying a plurality of users and information on the stop time period set for each of the plurality of pieces of identification information in association with each other. The time control means controls, when one of the plurality of pieces of identification information is selected by one of the plurality of users, a time period during which the stop means stops the movement of the pointer, based on the information on the stop time period corresponding to the selected identification information out of the plurality of pieces of information on the stop time period.

According to another embodiment, there is provided a control apparatus controlling a movement of a pointer on a screen based on at least a movement command and an operation signal output from an input apparatus including a main body, a movement detection means for detecting a movement of the main body, an operation section operated by a user, and an output means for outputting a movement command for moving the pointer on the screen, that corresponds to the detected movement of the main body, an operation command when input with an operation signal that is unrelated to the movement of the main body by an operation to the operation section, the operation command corresponding to the input operation signal, and the operation signal. In this case, the control apparatus includes a reception means, a coordinate value generation means, a stop means, a storage means, and a time control means. The reception means receives at least the movement command and the operation signal. The coordinate value generation means generates coordinate values of the pointer on the screen in accordance with the received movement command. The stop means stops the movement of the pointer on the screen during a predetermined stop time period since one of the reception of the operation signal and a cancel of the reception of the operation signal. The storage means stores a plurality of pieces of identification information for identifying a plurality of users and information on the stop time period set for each of the plurality of pieces of identification information in association with each other. The time control means controls, when one of the plurality of pieces of identification information is selected by one of the plurality of users, a time period during which the stop means stops the movement of the pointer, based on the information on the stop time period corresponding to the selected identification information out of the plurality of pieces of information on the stop time period.

According to another embodiment, there is provided a control method including: detecting a movement of a main body of an input apparatus; outputting, by the input apparatus, a movement command for moving a pointer on a screen, that corresponds to the detected movement of the main body; outputting, when the input apparatus is input with an operation signal that is unrelated to the movement of the main body by an operation to an operation section that is provided to the input apparatus and operated by a user, an operation command corresponding to the input operation signal; stopping the movement of the pointer on the screen during a predetermined stop time period since one of the input of the operation signal and a cancel of the input of the operation signal; storing a plurality of pieces of identification information for identifying a plurality of users and information on the stop time period set for each of the plurality of pieces of identification information in association with each other; and controlling, when one of the plurality of pieces of identification information is selected by one of the plurality of users, a time period during which the movement of the pointer is stopped, based on the information on the stop time period corresponding to the selected identification information out of the plurality of pieces of information on the stop time period.

In the descriptions above, elements described as " . . . means" may be realized by hardware or both software and hardware. When the elements are realized by both software and hardware, the hardware includes at least a storage device for storing software programs. Typically, hardware is structured by selectively using at least one of a CPU (Central Processing Unit), an MPU (Micro Processing Unit), a RAM (Random Access Memory), a ROM (Read Only Memory), a DSP (Digital Signal Processor), an FPGA (Field Programmable Gate Array), an ASIC (Application Specific Integrated Circuit), a NIC (Network Interface Card), a WNIC (Wireless NIC), a modem, an optical disc, a magnetic disc, and a flash memory.

These and other objects, features and advantages will become more apparent in light of the following detailed description of best mode embodiments thereof, as illustrated in the accompanying drawings.

Additional features and advantages are described herein, and will be apparent from the following Detailed Description and the figures.

DETAILED DESCRIPTION

Hereinafter, embodiments are described with reference to the drawings.

Figure 1:
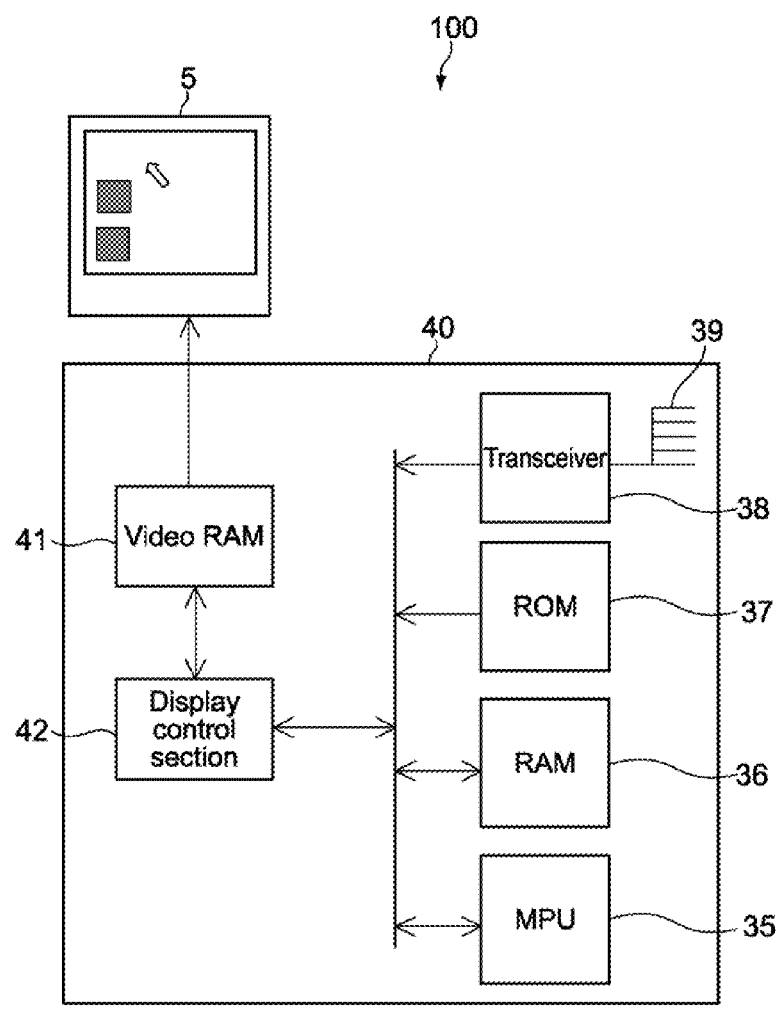
FIG. 1 is a diagram showing a control system according to an embodiment.
Figure 1:
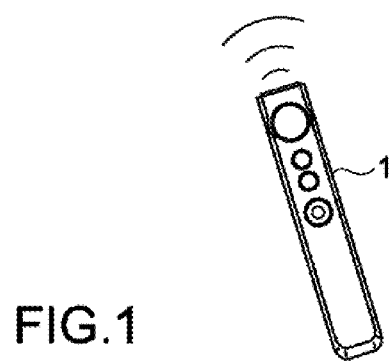

FIG. 1 is a diagram showing a control system according to an embodiment. A control system 100 includes a display apparatus 5, a control apparatus 40, and an input apparatus 1.

Figure 2:
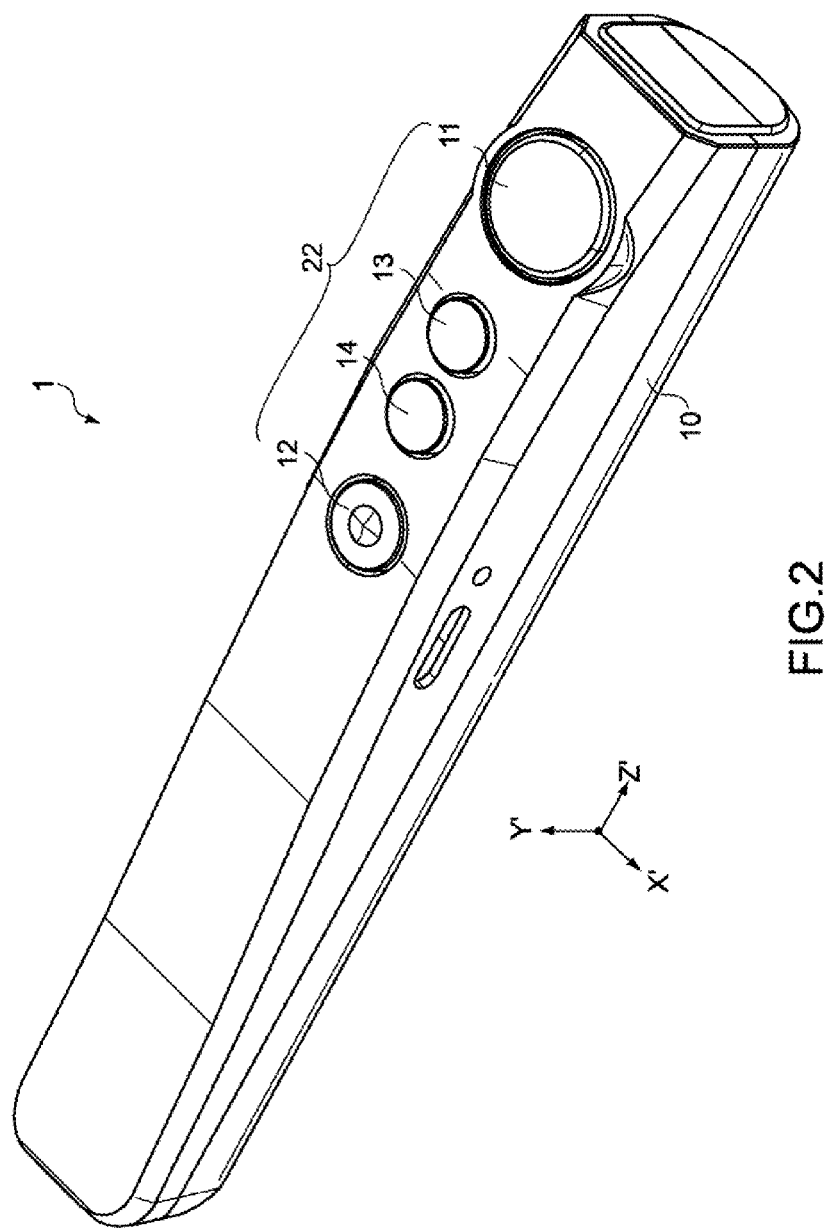
FIG. 2 is a perspective diagram showing an input apparatus.

FIG. 2 is a perspective diagram showing the input apparatus 1. The input apparatus 1 is of a size that a user is capable of holding. The input apparatus 1 is of a pen type and a user can hold the input apparatus 1 like holding a pen.

The input apparatus 1 includes a main body 10 and an operation section 22 including four buttons 11 to 14 and the like provided at an upper portion of the main body 10. The button 11 disposed at an end portion of the main body 10 is a so-called enter button and functions as a left button of a mouse as an input device for a PC, for example, and the button 12 disposed at a center of the main body 10 functions as a right button of a mouse, for example.

For example, a "drag and drop" operation may be executed by moving the input apparatus 1 while pressing the button 11, and a file may be opened by double-clicking the button 11.

The button 13 has a function as a forward button for forwarding an image displayed on a screen 3 to a next image, and the button 14 has a function as a back button for displaying again the image preceding the image displayed on the screen 3. The functions of the buttons 13 and 14 may be opposite. A scroll operation may be performed by press-and-holding the button 13 (or 14). Locations of the buttons 11 to 14, a content of a command issued, and the like can arbitrarily be changed.

Figure 3:
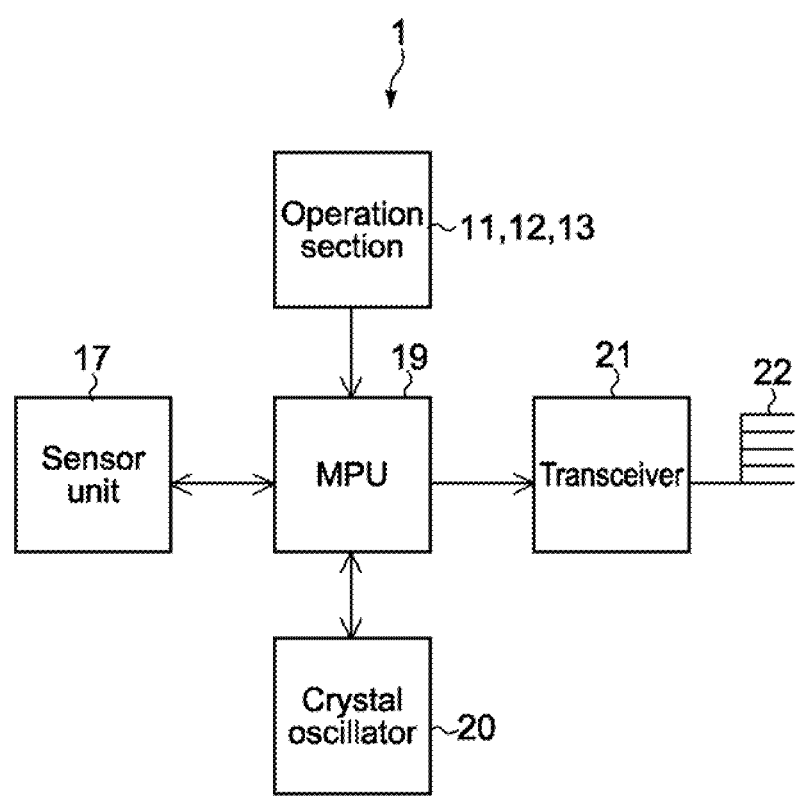
FIG. 3 is a block diagram showing an electrical structure of the input apparatus.
Figure 4:
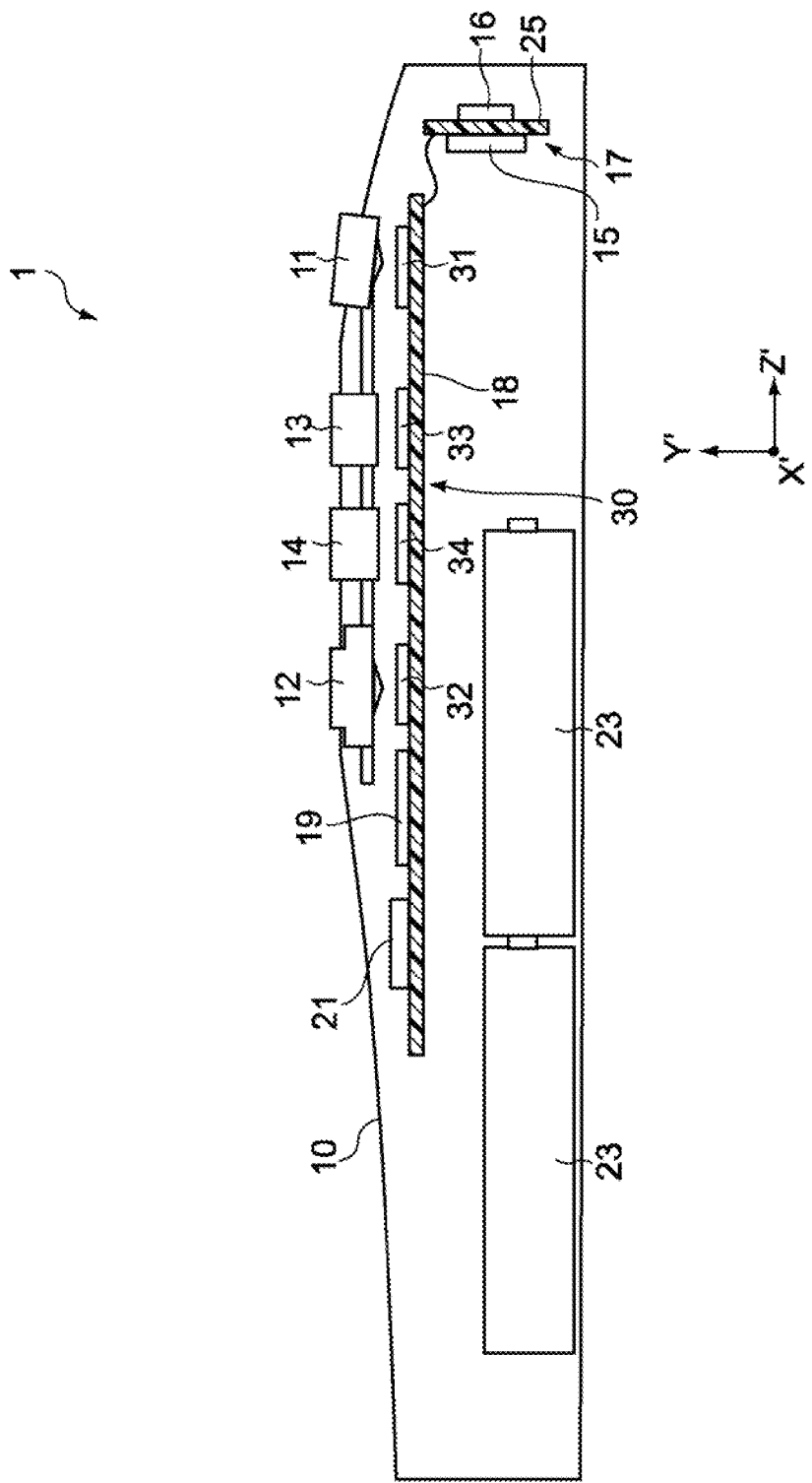
FIG. 4 is a cross-sectional diagram of the input apparatus.

FIG. 3 is a block diagram showing an electrical structure of the input apparatus 1. FIG. 4 is a cross-sectional diagram of the input apparatus 1.

The input apparatus 1 includes a sensor unit 17 conceptually included in a movement detection means, a control unit 30, and batteries 23.

Figure 5A:
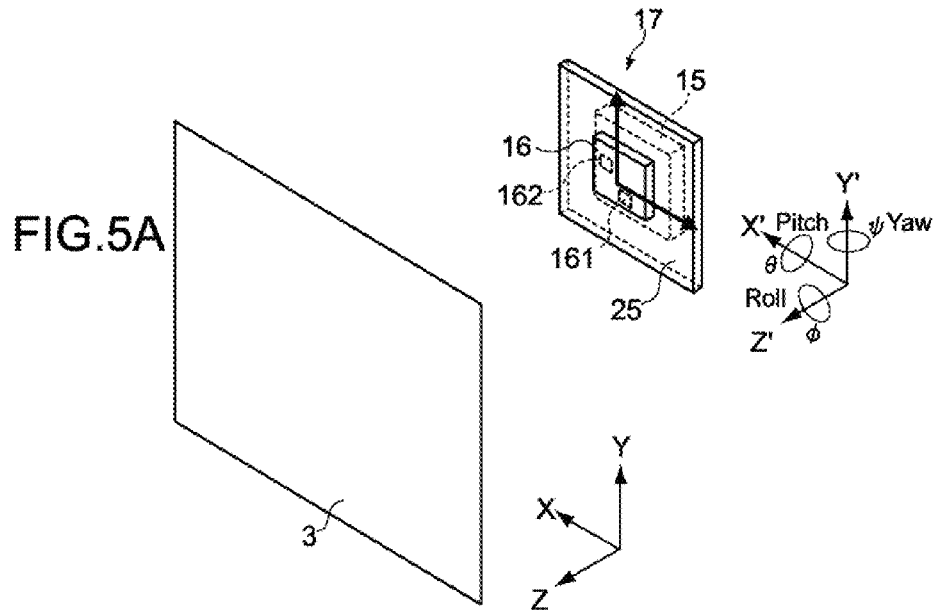
FIG. 5 are perspective diagrams showing a sensor unit.
Figure 5B:
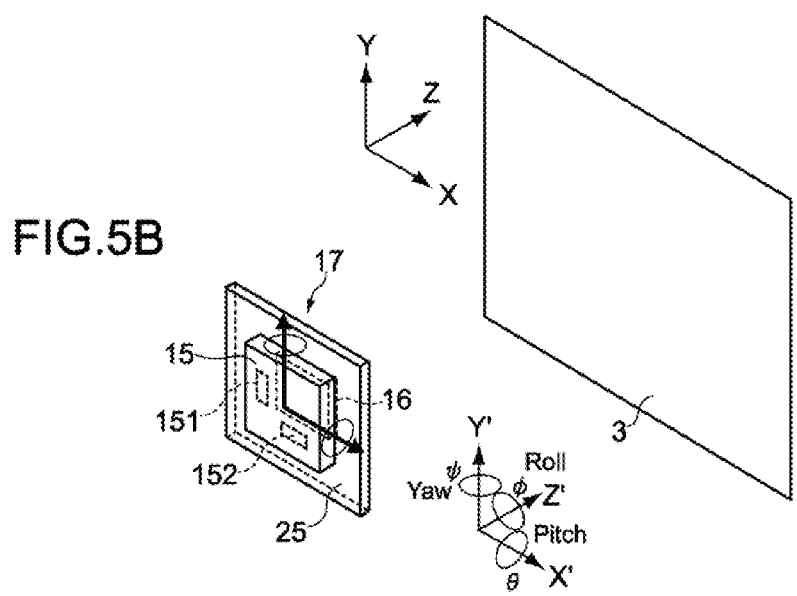

FIGS. 5A and 5B are perspective diagrams showing the sensor unit 17.

As shown in FIG. 5A, the sensor unit 17 includes an acceleration sensor unit 16 for detecting accelerations in different angles such as along two orthogonal axes (X axis and Y axis). Specifically, the acceleration sensor unit 16 includes two sensors, that is, an acceleration sensor 161 for an X'-axis direction and an acceleration sensor 162 for a Y'-axis direction.

As shown in FIG. 5B, the sensor unit 17 further includes an angular velocity sensor unit 15 for detecting angular accelerations about the two orthogonal axes. Specifically, the angular velocity sensor unit 15 includes two sensors, that is, an angular velocity sensor 151 for a yaw direction and an angular velocity sensor 152 for a pitch direction.

The acceleration sensor unit 16 and the angular velocity sensor unit 15 are packaged and respectively mounted on a first surface of a circuit board 25 and a second surface thereof on the other side of the first surface. By thus mounting the acceleration sensor unit 16 and the angular velocity sensor unit 15 on the first and second surfaces of the circuit board 25, respectively, an area of a main surface of the circuit board 25 can be reduced, with the result that the sensor unit 17 can be reduced in size. Accordingly, it becomes easier for the sensor 17 to be incorporated in the main body 10.

As each of the angular velocity sensors 151 and 152 for the yaw and pitch directions, respectively, a vibration gyro sensor for detecting Coriolis force in proportion to an angular velocity is used. As each of the acceleration sensors 161 and 162 for the X'- and Y'-axis directions, respectively, any sensor such as a piezoresistive sensor, a piezoelectric sensor, or a capacitance sensor may be used. Each of the angular velocity sensors 151 and 152 is not limited to the vibration gyro sensor, and a rotary top gyro sensor, a ring laser gyro sensor, a gas rate gyro sensor, and the like may also be used.

In descriptions on FIGS. 2, 4, and the like, a longitudinal direction of the main body 10 is referred to as Z' direction, a thickness direction of the main body 10 is referred to as Y' direction, and a width direction of the main body 10 is referred to as X' direction for convenience. In this case, as shown in FIG. 4, the sensor unit 17 is incorporated into the main body 10 such that the surfaces of the circuit board 25 on which the acceleration sensor unit 16 and the angular velocity sensor unit 15 are mounted become substantially parallel to an X'-Y' plane. Thus, as described above, the sensor units 16 and 15 each detect physical amounts with respect to the two axes, that is, the X' axis and the Y' axis.

In the specification, a coordinate system that moves along with the input apparatus 1, that is, a coordinate system fixed to the input apparatus 1 is expressed using an X' axis, a Y' axis, and a Z' axis, whereas a coordinate system stationary on earth, that is, an inertial coordinate system is expressed using an X axis, a Y axis, and a Z axis. Moreover, with regard to a movement of the input apparatus 1, a rotational direction about the X' axis is sometimes referred to as pitch direction, a rotational direction about the Y' axis is sometimes referred to as yaw direction, and a rotational direction about the Z' axis (roll axis) is sometimes referred to as roll direction.

As shown in FIGS. 3 and 4, the control unit 30 includes a main substrate 18, an MPU 19 (or CPU) mounted on the main substrate 18, a crystal oscillator 20, a transceiver 21, switches 31 to 34, and an antenna (not shown) printed on the main substrate 18.

The MPU 19 includes a built-in volatile or nonvolatile memory requisite therefor. The MPU 19 is input with a detection signal from the sensor unit 17, an operation signal from the operation section 22, and the like, and executes various kinds of operational processing in order to generate predetermined control signals in response to those input signals. The memory may be provided separate from the MPU 19. A DSP, an FPGA, and the like may be used instead of the MPU 19.

Typically, the sensor unit 17 outputs analog signals. In this case, the MPU 19 includes an A/D (Analog/Digital) converter. Alternatively, the sensor unit 17 may be a unit that includes the A/D converter.

The transceiver 21 transmits, as RF radio signals, the control signals generated by the MPU 19 to the control apparatus 40 via the antenna.

The crystal oscillator 20 generates clocks and supplies them to the MPU 19. As the batteries 23, dry cell batteries, rechargeable batteries, and the like are used.

The switches 31 to 34 respectively correspond to the buttons 11 to 14, and ON/OFF operation signals are input to the MPU 19 through those switches.

As shown in FIG. 1, the control apparatus 40 is a computer and includes an MPU 35 (or CPU), a RAM 36, a ROM 37, a display control section 42, a video RAM 41, an antenna 39, and a transceiver 38.

The transceiver 38 receives the control signal transmitted from the input apparatus 1 via the antenna 39. The MPU 35 analyzes the control signal and executes various kinds of operational processing. The display control section 42 mainly generates screen data to be displayed on the screen 3 of the display apparatus 5 under control of the MPU 35. The video RAM 41 as a work area of the display control section 42 temporarily stores the generated screen data. As will be described later, a movement command, an operation command, signals of velocity-related values, acceleration signals, or other signals are transmitted from the input apparatus 1 as the control signals, for example.

The control apparatus 40 may be an apparatus dedicated to the input apparatus 1, or may be a PC or the like. The control apparatus 40 is not limited to the PC and may be a computer integrally formed with the display apparatus 5, audiovisual equipment, a projector, a game device, a car navigation system, or the like.

Examples of the display apparatus 5 include a liquid crystal display and an EL (Electro-Luminescence) display, but are not limited thereto. The display apparatus 5 may alternatively be an apparatus integrally formed with a display and capable of receiving television broadcasts and the like.

Figure 6:
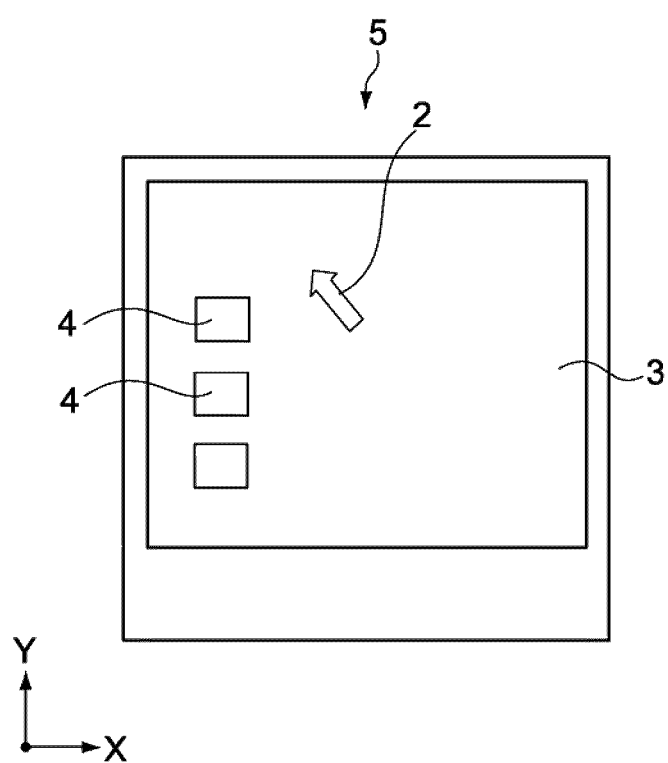
FIG. 6 is a diagram showing an example of a screen displayed on a display apparatus.

FIG. 6 is a diagram showing an example of the screen 3 displayed on the display apparatus 5. UIs such as icons 4 and a pointer 2 are displayed on the screen 3. The icons are images on the screen 3 representing functions of programs, execution commands, file contents, and the like of the computer. It should be noted that on the screen 3, the horizontal direction is referred to as X-axis direction and the vertical direction is referred to as Y-axis direction.

Next, a description will be given on typical examples of ways of moving the input apparatus 1 and ways the pointer 2 moves on the screen 3 accordingly. FIG. 7 are explanatory diagrams therefor.

Figure 7A:
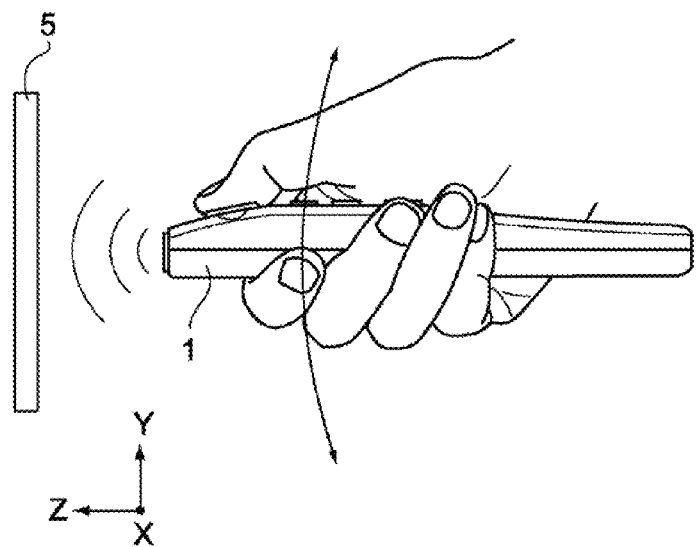
FIG. 7 are diagrams for illustrating typical examples of ways of moving the input apparatus and ways a pointer moves on the screen accordingly.
Figure 7B:
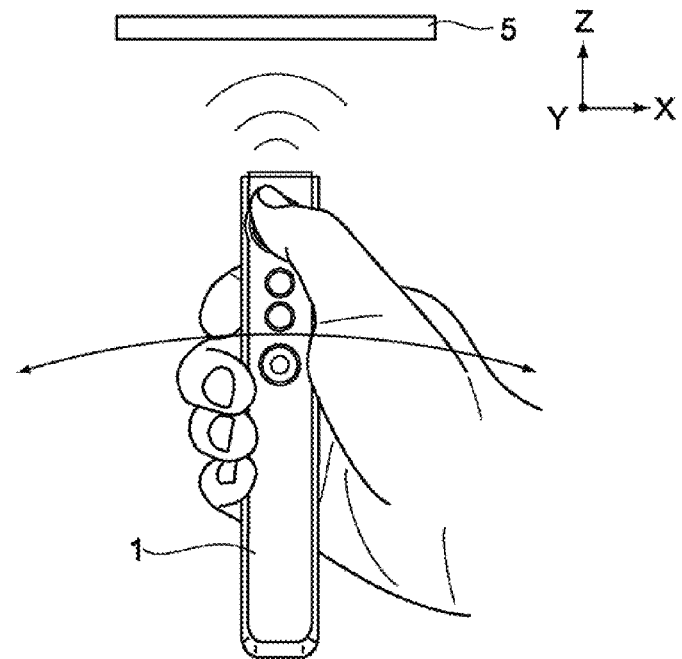

As shown in FIGS. 7A and 7B, the user holds the input apparatus 1 such that the buttons 11 to 14 side of the input apparatus 1 faces upward and the end portion of the main body 10 where the enter button 11 is provided is aimed at the display apparatus 5 side. In this state, the circuit board 25 of the sensor unit 17 (see FIGS. 5A and 5B) is close to being in parallel with the screen 3 of the display apparatus 5, and the two axes as detection axes of the sensor unit 17 (X' axis and Y' axis) respectively correspond to the horizontal axis (X axis) (pitch axis) and the vertical axis (Y axis) (yaw axis) on the screen 3. Hereinafter, the position of the input apparatus 1 as shown in FIGS. 7A and 7B will be referred to as reference position.

As shown in FIG. 7A, in the reference position, the user swings a wrist or an arm in the vertical direction, that is, the pitch direction. At this time, the acceleration sensor 162 for the Y'-axis direction detects an acceleration $a_y$ in the Y'-axis direction (second or first acceleration value), and the angular velocity sensor 152 for the pitch direction detects, as an angle-related value, an angular velocity $\omega_\theta$ about the X' axis. Based on those detection values, the control apparatus 40 controls display of the pointer 2 so that the pointer 2 moves in the Y-axis direction.

Meanwhile, as shown in FIG. 7B, in the reference position, the user swings a wrist or an arm in the lateral direction, that is, the yaw direction. At this time, the acceleration sensor 161 for the X'-axis direction detects an acceleration $a_x$ in the X'-axis direction (first or second acceleration value), and the angular velocity sensor 151 for the yaw direction detects, as an angle-related value, an angular velocity $\omega_\psi$ about the Y' axis. Based on those detection values, the control apparatus 40 controls display of the pointer 2 so that the pointer 2 moves in the X-axis direction.

Figure 8:
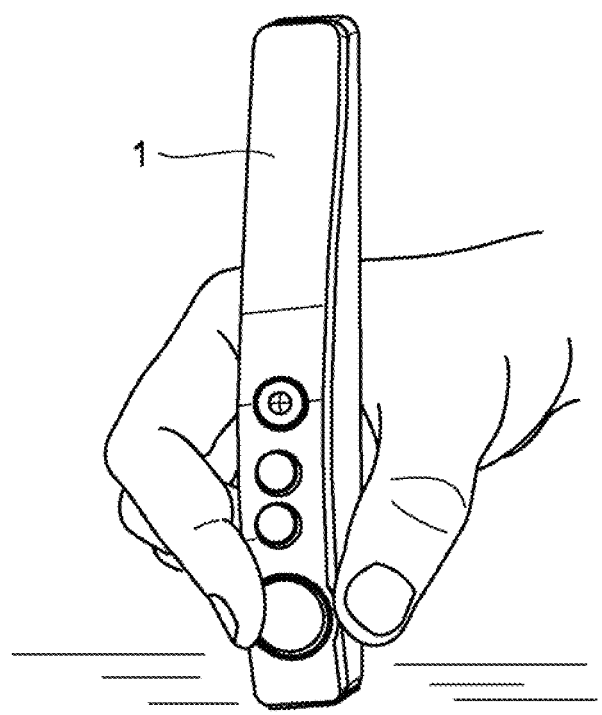
FIG. 8 is a diagram showing a way a user holds a main body of the input apparatus when operating the input apparatus in a manual input operation form.

FIG. 8 is a diagram showing a way a user holds the main body 10 of the input apparatus 1 when operating the input apparatus 1 in a manual input operation form. The user performs a manual input operation while holding the main body 10 so that the end portion thereof where the sensor unit 17 is mounted faces downward. Hereinafter, the position of the main body 10 as shown in FIG. 8 will be referred to as pen position.

Based on acceleration values and angular velocity values obtained every predetermined number of clocks (first clock), the MPU 19 of the input apparatus 1 typically calculates the velocity values in the X- and Y-axis directions every first clock, and outputs the velocity values. Depending on a velocity value calculation method, the MPU 19 outputs the velocity values in the X- and Y-axis directions every second clock longer than the first clock in some cases.

The control apparatus 40 converts a displacement of the input apparatus 1 in the X-axis direction or the yaw direction per unit time into a displacement amount of the pointer 2 on the X axis on the screen 3, and converts a displacement of the input apparatus 1 in the Y-axis direction or the pitch direction per unit time into a displacement amount of the pointer 2 on the Y axis on the screen 3, and thus moves the pointer 2. Typically, regarding the velocity values supplied every first or second clock, the MPU 35 of the control apparatus 40 adds an n-th velocity value that has been supplied to a (n−1)-th velocity value that has been supplied. Accordingly, the n-th velocity value that has been supplied corresponds to the displacement amount of the pointer 2, and coordinate information of the pointer 2 on the screen 3 is generated. In this case, mainly the MPU 35 of the control apparatus 40 functions as a coordinate information generation means.

For suppressing the movement of the pointer 2 that corresponds to a vibration of the main body 10 of the input apparatus 1 caused by a hand movement of the user, the control system 100 of this embodiment includes a function of attenuating, by a predetermined scale factor, an output value of a signal of a predetermined frequency range out of an output value on a velocity of the main body 10 calculated by the MPU 19. The input apparatus 1 typically has that function.

Figure 9:
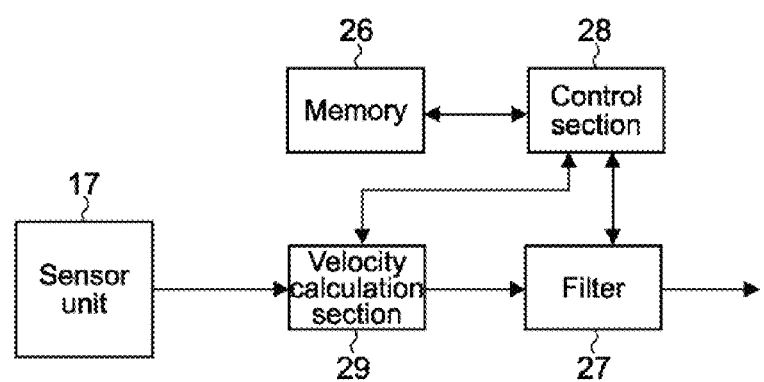
FIG. 9 is a block diagram showing a structure of the input apparatus for realizing a shake correction function.

FIG. 9 is a block diagram showing a structure of the input apparatus 1 for realizing that function. The input apparatus 1 includes a velocity calculation section 29, a filter 27, a control section 28, and a memory 26. The velocity calculation section 29, the filter 27, the control section 28, and the memory 26 are mainly functions of the MPU 19.

The velocity calculation section 29 calculates the velocity values of the main body 10 in the X'- and Y'-axis directions based on the physical amounts output from the sensor unit 17 like acceleration values in the X'- and Y'-axis directions output from the acceleration sensor unit 16.

The filter 27 attenuates, by predetermined scale factors, velocity values of signals of the predetermined frequency range out of the velocity values calculated by the velocity calculation section 29. The predetermined frequency range is a frequency range corresponding to a hand movement. The frequency range is typically 1 to 20 Hz, but is not limited thereto. Hereinafter, the predetermined frequency will be referred to as shake frequency. The filter 27 is constituted of a digital filter.

Figure 10:
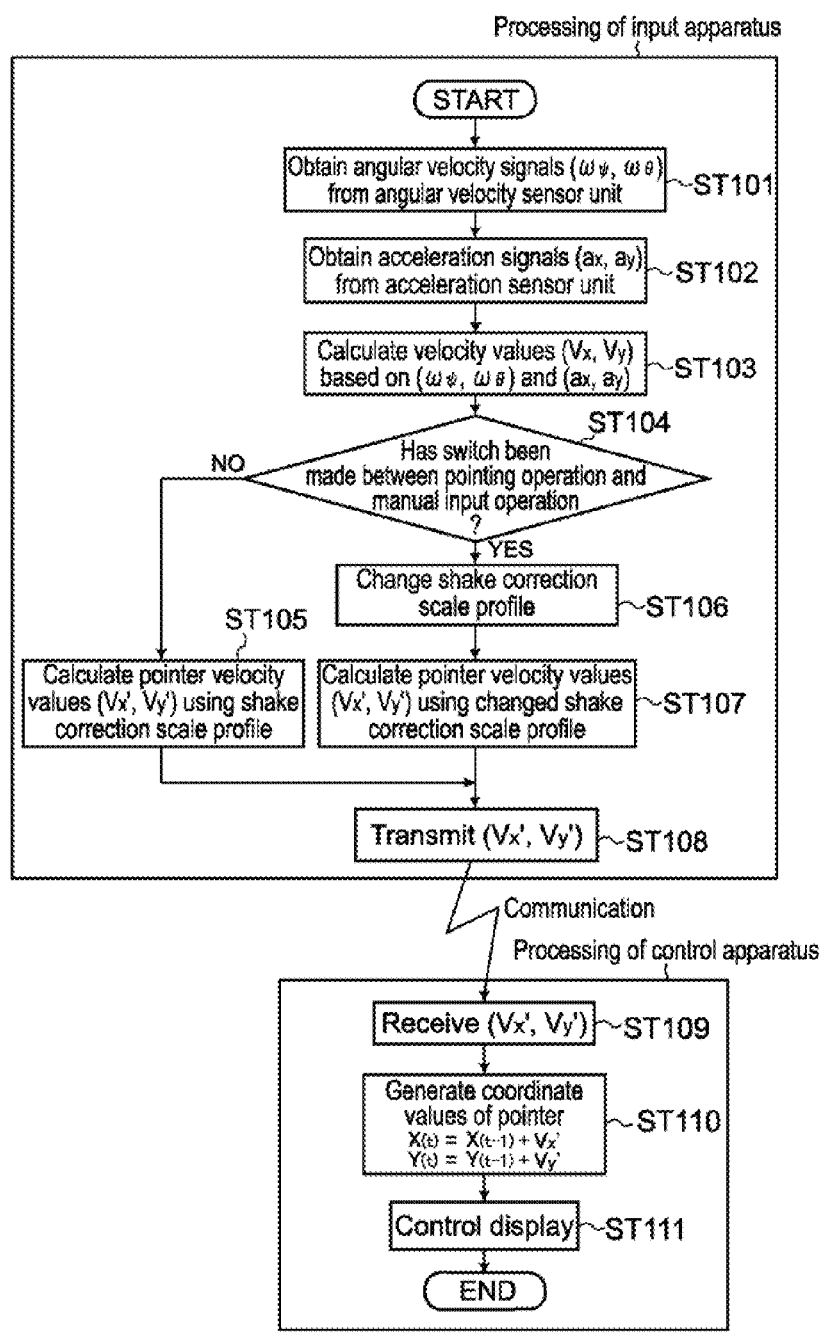
FIG. 10 is a flowchart showing a basic operation of the control system.

Next, a basic operation of the control system 100 structured as described above will be described. FIG. 10 is a flowchart showing the operation.

The power of the input apparatus 1 is turned on. For example, the user turns on a power supply switch or the like provided to the input apparatus 1 or the control apparatus 40 to turn on the power of the input apparatus 1. Upon turning on the power, biaxial angular velocity signals are output from the angular velocity sensor unit 15. The MPU 19 obtains the first angular velocity value $\omega_\psi$ and the second angular velocity value $\omega_\theta$ from the biaxial angular velocity signals (Step 101).

Further, upon turning on the power of the input apparatus 1, biaxial acceleration signals are output from the acceleration sensor unit 16. The MPU 19 obtains the first acceleration value $a_x$ and the second acceleration value $a_y$ from the biaxial acceleration signals (Step 102). The signals of the acceleration values are signals corresponding to the position of the input apparatus 1 at a point when the power is turned on. The position of the main body 10 right after the power is turned on may be the reference position shown in FIG. 7, the pen position shown in FIG. 8, or other positions.

It should be noted that the MPU 19 typically carries out the processes of Steps 101 and 102 in sync with a predetermined clock cycle.

Based on the acceleration values ($a_x$, $a_y$) and the angular velocity values ($\omega_\psi$, $\omega_\theta$), the velocity calculation section 29 calculates the velocity values ($V_x$, $V_y$) (Step 103). The calculation of the velocity values by the velocity calculation section 29 will be described later in detail. The first velocity value $V_x$ is a velocity value in a direction along the X axis, and the second velocity value $V_y$ is a velocity value in a direction along the Y axis.

As the method of calculating the velocity values ($V_x$, $V_y$), there is a method in which the velocity calculation section 29 calculates the velocity values by, for example, integrating the acceleration values ($a_x$, $a_y$) while using the angular velocity values ($\omega_\psi$, $\omega_\theta$) as an adjunct for the integration operation. In contrast, there is also a method in which the velocity calculation section 29 obtains the velocity values corresponding to the angular velocity values ($\omega_\psi$, $\omega_\theta$) by an operation or by using a lookup table and uses the acceleration values as an adjunct for that operation, for example.

Alternatively, the MPU 19 divides the acceleration values ($a_x$, $a_y$) by differentiation values ($\Delta\omega_\psi$, $\Delta\omega_\theta$) of the angular velocity values ($\omega_\psi$, $\omega_\theta$) to thus obtain radius gyrations ($R_\psi$, $R_\theta$) of the movement of the main body 10. The velocity values ($V_x$, $V_y$) are calculated by multiplying the radius gyrations ($R_\psi$, $R_\theta$) by the angular velocity values ($\omega_\psi$, $\omega_\theta$).

Alternatively, a case where only the acceleration sensor unit 16 is provided as the movement sensor and not the angular velocity sensor unit 15, and the velocity values ($V_x$, $V_y$) are calculated by simply integrating the acceleration values ($a_x$, $a_y$) is also possible. On the other hand, a case where only the angular velocity sensor unit 15 is provided as the movement sensor and not the acceleration sensor unit 16, and the velocity values ($V_x$, $V_y$) corresponding to the angular velocity values ($\omega_\psi$, $\omega_\theta$) are calculated by an operation or a lookup table is also possible.

The MPU 19 judges whether an operation form has been switched between the pointing operation form and the manual input operation form (Step 104). The pointing operation form is a pointing operation of pointing a predetermined position on the screen 3 using the pointer 2 while holding the main body 10 as shown in FIGS. 7A and 7B, for example. In the manual input operation shown in FIG. 8, the user typically uses application software of the control apparatus 40 to input letters, numerals, symbols, pictures, and the like. In the manual input operation, the user moves the main body 10 3-dimensionally or moves the main body 10 on a desk, a table, a floor, or the like to perform the manual input operation. A method of detecting which of the pointing operation form and the manual input operation form the current operation form of the main body is will be described later.

When the operation form is not switched, the MPU 19 executes a shake correction using a shake correction scale profile to be described later that has been used up to now without changing the shake correction scale profile by the filter 27. Accordingly, the pointer velocity values ($V_x'$, $V_y'$) corresponding to the velocity of the pointer 2 on the screen 3 are calculated. Typically, for the shake correction, the MPU 19 multiplies the output values within the shake frequency range out of the output values as the velocity values calculated in Step 103 by predetermined scale factors in order to attenuate the output values.

Figure 11:
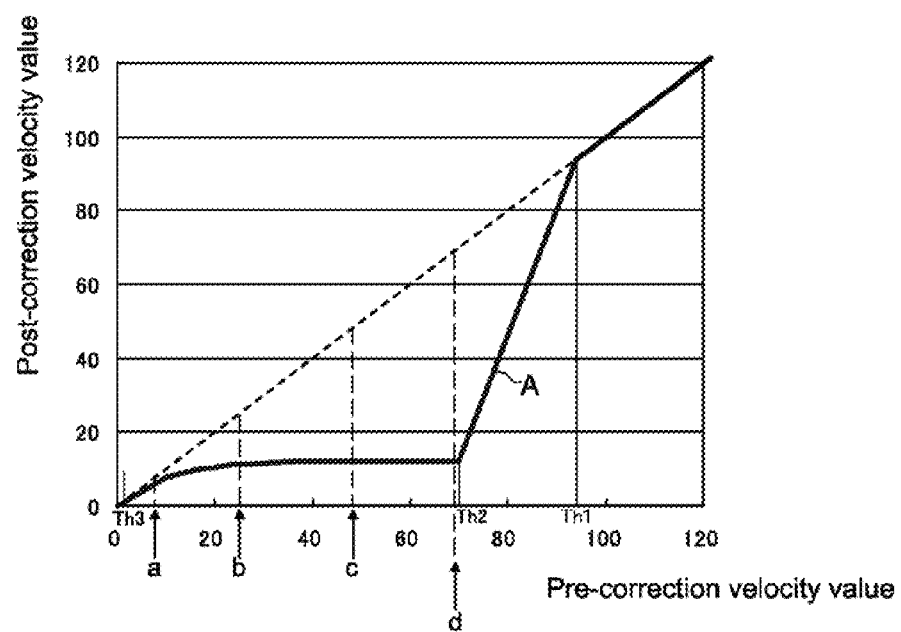
FIG. 11 is a graph showing an example of filter characteristics at a typical frequency (e.g., 15 Hz) that is within a frequency range of a hand movement.
Figure 12A:
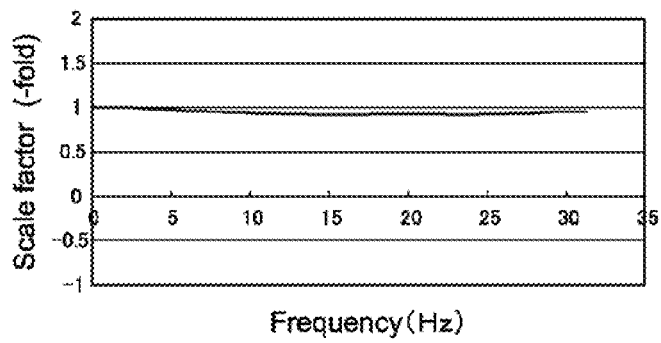
FIGS. 12A to 12D are graphs showing filter frequency characteristics respectively corresponding to pre-correction velocity values a to d shown in FIG. 11.
Figure 12B:
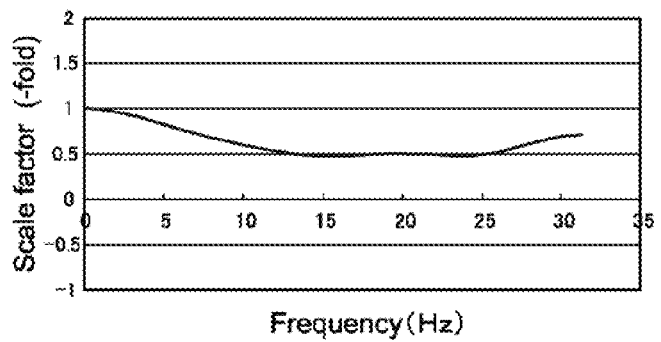
Figure 12C:
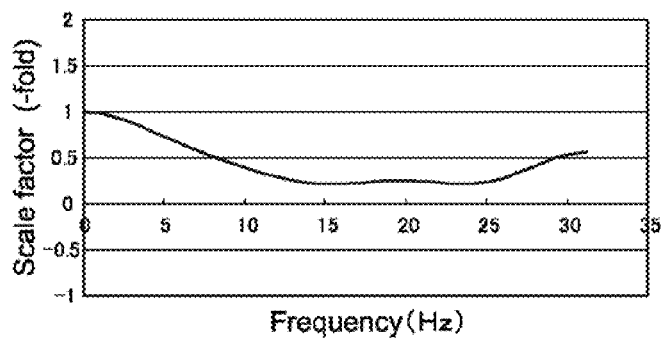
Figure 12D:
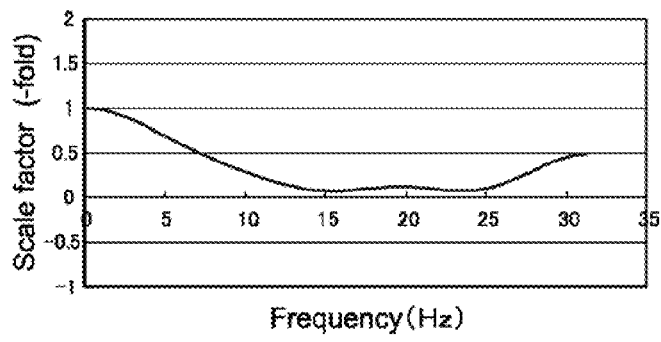

FIG. 11 is a graph showing an example of characteristics of the filter 27 (hereinafter, referred to as shake correction scale profile) at a typical frequency (e.g., 15 Hz) that is within the shake frequency range. The abscissa axis in the graph represents a velocity value of the input apparatus 1 before correction by the filter 27 (hereinafter, referred to as pre-correction velocity value), and the ordinate axis represents a velocity value of the input apparatus 1 after the correction by the filter 27 (hereinafter, referred to as post-correction velocity value). The velocity values have an absolute value of 8 bits (±128).

The broken line in the graph indicates a state where a scale factor of the filter 27 is 1, that is, a state where the attenuation function of the filter 27 is not working. A line obtained when the scale factor smaller than 1 is actually applied will hereinafter be referred to as correction line A. A value having the value indicated by the broken line as a denominator and a value indicated by the correction line A as a numerator becomes the scale factor.

Threshold values Th1, Th2, and Th3 are set for the pre-correction velocity value. In this example, the pre-correction velocity value of about 90 to 95 is set as the threshold value Th1, the pre-correction velocity value of about 70 is set as the threshold value Th2, and the pre-correction velocity value of about 1 to 3 is set as the threshold value Th3. The threshold values Th1 to Th3 can be changed as appropriate.

Further, the scale factor of the filter 27 in this example is set as follows.

With the pre-correction velocity value of 0 to Th3 and Th1 or more, the scale factor is set to 1. In other words, within these ranges, the pre-correction velocity value and the post-correction velocity value are the same.

From Th3 to Th2, the scale factor is set to gradually decrease as the pre-correction velocity value increases.

From Th2 to Th1, the scale factor is set to gradually increase as the pre-correction velocity value increases.

FIGS. 12A to 12D are graphs showing examples of frequency characteristics of the filter 27 respectively corresponding to pre-correction velocity values a to d shown in FIG. 11. It can be seen from FIGS. 12A to 12D that the scale factor is set to decrease as the pre-correction velocity value increases. Due to the frequency characteristics of the scale factor as described above, the graph shown in FIG. 11 is thus a shake correction scale profile at a certain typical frequency. Therefore, the correction line A of the shake correction scale profile different for each frequency (e.g., correction lines having the same Th1, Th2, or the like but different scale factors) is set.

The control section 28 thus controls the scale factor of the filter 27 based on the velocity values of the input apparatus 1. The frequency characteristics of the scale factor of the filter 27 are set by appropriately setting a sampling cycle, a tap count, scale factor values of velocity values, and the like obtained by a moving average at the time the filter 27 is designed.

When it is judged YES in Step 104, the MPU 19 changes the shake correction scale profile (Step 106). Then, the MPU 19 carries out the shake correction by the changed shake correction scale profile and thus calculates the velocity values ($V_x'$, $V_y'$) (Step 107).

Figures 13, 14A, 14B:
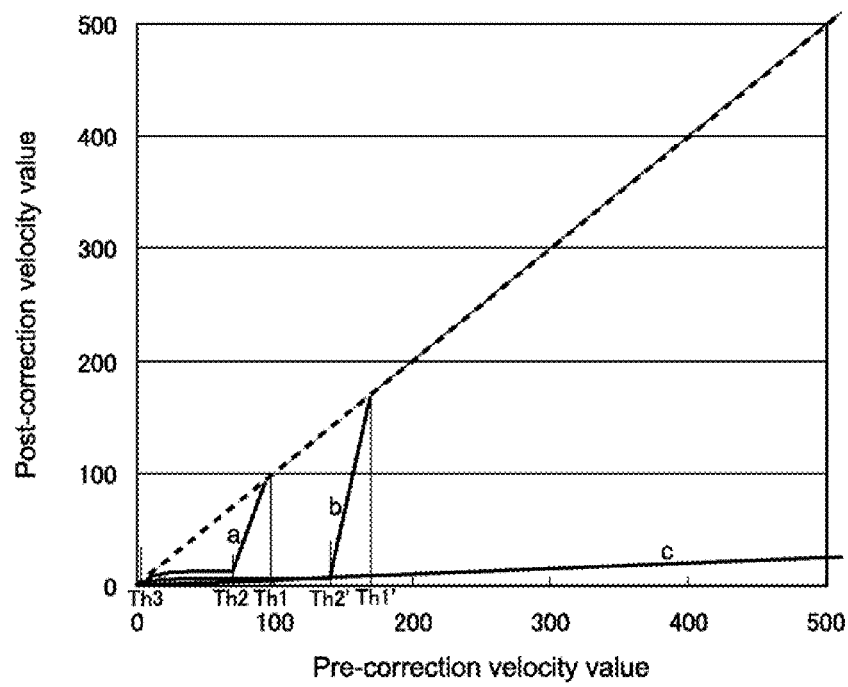
FIG. 13 is a graph showing a plurality of shake correction scale profile patterns.
FIG. 14A is a diagram showing an example of a screen input with letters using manual input software in a case where a shake correction scale profile c is used.
FIG. 14B is a diagram showing an example of the screen input with letters in a case where a filter function is stopped.

FIG. 13 is a graph showing a plurality of shake correction scale profile patterns. Because individual differences in hand movement velocities are large, a velocity range to be a target for the shake correction by obtaining a distribution of magnitudes of shake velocities through a user test at the time the filter 27 was designed has been determined. The graph of FIG. 13 shows a result thereof. The magnitude of the shake velocity was set as a maximum vibration velocity, for example.

In this example, three types of shake correction scale profiles are shown.

The shake correction scale profile a is a profile for users within $2\sigma$, in which the velocity range to be the target for the shake correction is narrow.

The shake correction scale profile b is a profile for users within $4\sigma$, in which the velocity range to be the target for the shake correction is wide.

The shake correction scale profile c is a profile that has a scale factor smaller than 1 and is asymptotic to the abscissa axis, in which the scale factor is constant regardless of the pre-correction velocity value. The shake correction scale profile c is mainly used in the manual input operation form. The shake correction scale profile c has the attenuation function, that is, a degree of a shake correction larger than those of the other shake correction scale profiles a and b.

It should be noted that similar to the velocity profile shown in FIG. 11, Th1 (Th1'), Th2 (Th2'), and Th3 are set for the shake correction scale profiles a and b in this example. It is also possible to set a constant scale factor that is additionally lower than that of the shake correction scale profile c of FIG. 13.

Information on the plurality of shake correction scale profiles a to c is stored in advance in the memory 26 or the like for the same frequency, and Th1, Th2, Th1', Th2', and the like are stored in the memory 26 or the like for each of the shake correction scale profiles. Assuming that, although the user has been operating the main body 10 in the pointing operation form up to now, the operation form is switched to the manual input operation form in Step 104, the MPU 19 uses the shake correction scale profile c for the manual input to calculate the pointer velocity values ($V_x'$, $V_y'$). In the case of the manual input, with a lower, constant scale factor, the user feels more ease in operation, that is, letters and the like can be input with more ease.

FIGS. 14A and 14B are diagrams showing Japanese characters (representing a, e, i, o, u) input to a computer using generally-used letter input software and the characters are displayed on the screen. FIG. 14A shows a case where the shake correction scale profile c is used, and FIG. 14B shows a case where the filter function is stopped. It can be seen from the figures that by using the shake correction scale profile c, an influence of minute hand movements of the user when inputting characters and the like can be removed.

It should be noted that one or a plurality of shake correction scale profiles having a constant scale factor different from the scale factor of the shake correction scale profile c may be set.

Figure 15:
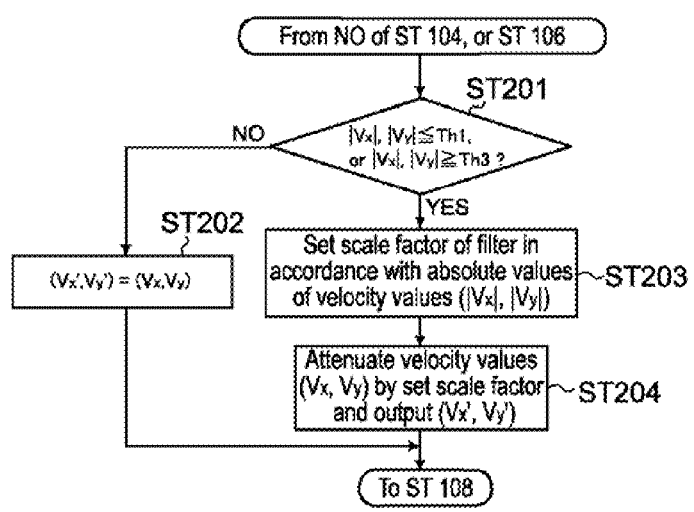
FIG. 15 is a flowchart showing an operation of a shake correction in a case where a scale factor of a shake correction scale profile is not constant.

Next, using a flowchart of FIG. 15, a description will be given on processing executed in a case where a shake correction is carried out using, for example, the shake correction scale profile shown in FIG. 11 and the shake correction scale profile a orb shown in FIG. 13 in Steps 105 and 107. Specifically, FIG. 15 is a flowchart showing an operation carried out in a case where the shake correction is performed using the shake correction scale profile having a nonconstant scale factor.

For example, referring to FIG. 11, the MPU 19 judges whether absolute values ($|V_x|$, $|V_y|$) of the velocity values ($V_x$, $V_y$) are equal to or smaller than Th1 or equal to or larger than Th3 (Step 201). In Step 201, the MPU 19 only needs to independently judge whether each of $|V_x|$ and $|V_y|$ is equal to or smaller than Th1.

However, the present application is not limited thereto and a judgment may be made on whether a combined vector amount ($[V_x^2+V_y^2]^{1/2}$) of the velocity values ($V_x$, $V_y$) is equal to or smaller than Th1 or equal to or larger than Th3. Alternatively, a larger one of $|V_x|$ and $|V_y|$ may be set as a representative value of the velocity values and a judgment may be made on whether the representative value is equal to or smaller than Th1 or equal to or larger than Th3. Accordingly, power consumption as well as a calculation amount of the MPU 19 can be reduced.

When the condition of Step 201 is not satisfied, the control section 28 of the MPU 19 outputs the velocity values with the scale factor set to 1 by the shake correction scale profile shown in FIG. 11. In other words, the MPU 19 sets the velocity values ($V_x$, $V_y$) output from the velocity calculation section 29 as ($V_x'$, $V_y'$) (Step 202) and transmits through the transceiver 21 information containing the velocity values ($V_x'$, $V_y'$) to the control apparatus 40 as a movement command for moving the pointer 2 on the screen 3 (Step 108).

On the other hand, when the condition of Step 201 is satisfied, the control section 28 sets scale factors of the filter 27 that correspond to the absolute values of the velocity values ($|V_x|$, $|V_y|$) output from the velocity calculation section 29 as shown in FIG. 11 (Step 203). The filter 27 attenuates the absolute values ($|V_x|$, $|V_y|$) by the set scale factors and outputs ($V_x'$, $V_y'$) (Step 204), and the MPU 19 transmits the values to the control apparatus 40 (Step 108).

Because the filter 27 dynamically attenuates the velocity values within the shake frequency range in accordance with the velocity values, even when a vibration including a hand movement occurs in the main body 10, the user is still capable of carrying out precise pointing operations with the pointer 2 on the screen 3.

In particular, in a case where the velocity values are larger than Th1, which means that the user is in midst of moving the pointer 2 to a relatively-distant position on the screen 3 from a certain position, if the filter 27 exerts its function, the user may be feel awkwardness due to a phase delay. Therefore, the scale factor is set to 1 so that the user will not feel the phase delay.

Further, the velocity values that are smaller than Th3, that is, extremely-small velocity values indicate a time when the user has almost completely stopped the input apparatus 1, an instant when the user starts moving the input apparatus 1 from a state where the input apparatus 1 is stopped, or an instant when the input apparatus 1 is stopped from the moved state. Therefore, also in this case, for preventing the phase delay, the scale factor is set to 1. This is because, particularly at an instant when the user starts moving the input apparatus 1 from the stopped state, the user tends to feel awkwardness due to the phase delay.

Moreover, the control section 28 controls the scale factor so that, as shown in FIG. 11, the scale factor gradually decreases until the velocity value that has exceeded Th3 reaches Th2 and gradually increases until the velocity value that has exceeded Th2 reaches Th1. It is considered that in the velocity range of Th1 or less in which a hand movement occurs, until the velocity value that has exceeded Th3 reaches Th2, the hand movement amount increases as the velocity value increases. Therefore, by controlling the scale factor to gradually decrease as the velocity value increases in this range, awkwardness in operation for the user can be eliminated. It is also considered that the hand movement amount becomes smaller as the velocity value increases after reaching Th2. Therefore, by controlling the scale factor to gradually increase until the velocity value that has exceeded Th2 reaches Th1, awkwardness in operation for the user can be eliminated.

Now, let us go back to the description on the flowchart shown in FIG. 10.

The MPU 35 of the control apparatus 40 receives the velocity values $(V_x', V_y')$ via the transceiver 38 (Step 109). The MPU 35 generates coordinate values $(X(t), Y(t))$ of the pointer 2 that correspond to the velocity values $(V_x', V_y')$ as shown in Equations (1) and (2) below (Step 110), and controls display so that the pointer 2 moves on the screen 3 (Step 111).

$$X(t)=X(t-1)+V_x' \qquad (1)$$

$$Y(t)=Y(t-1)+V_y' \qquad (2)$$

As described above, the shake correction scale profile is changed in accordance with the switch of the operation form. In other words, the MPU 19 selectively switches a first operational mode to a second operational mode and vice versa depending on the operation form of the main body 10 and calculates the pointer velocity values $(V_x', V_y')$. Accordingly, an operational feeling that matches both the pointing operation form and the manual input operation form can be obtained.

In addition, in the case of the manual input operation in which the user inputs letters and the like while the main body 10 is in contact with a desk, a table, a floor, and the like as described above, even when a vibration is caused in the main body 10 due to a contact state of the main body 10 and a contact surface, it is possible the cancel the vibration by the shake correction scale profile.

Figure 16:
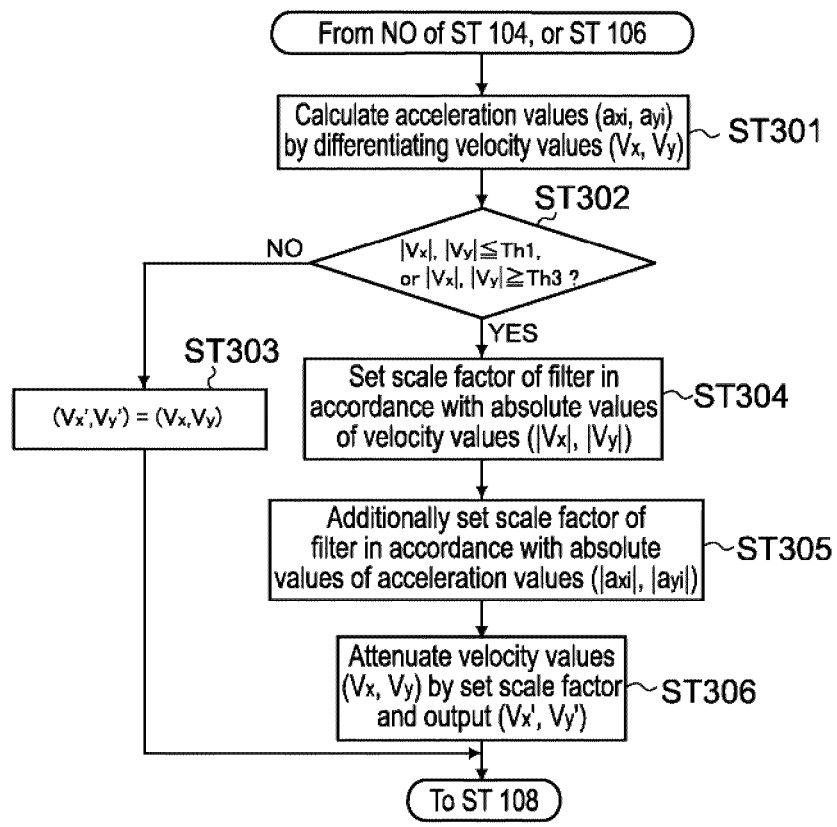
FIG. 16 is a flowchart showing an operation of the input apparatus according to an embodiment different from that of the operation shown in FIG. 15.

FIG. 16 is a flowchart showing an operation of the input apparatus 1 according to an embodiment different from that of the operation shown in FIG. 15.

In Step 301, the MPU 19 differentiates the velocity values $(V_x, V_y)$ obtained in Step 103 to thus calculate acceleration values $(a_{xi}, a_{yi})$ in the X'- and Y'-axis directions.

The processes of Steps 302 to 304 are the same as those of Steps 201 to 203.

Figure 17A:
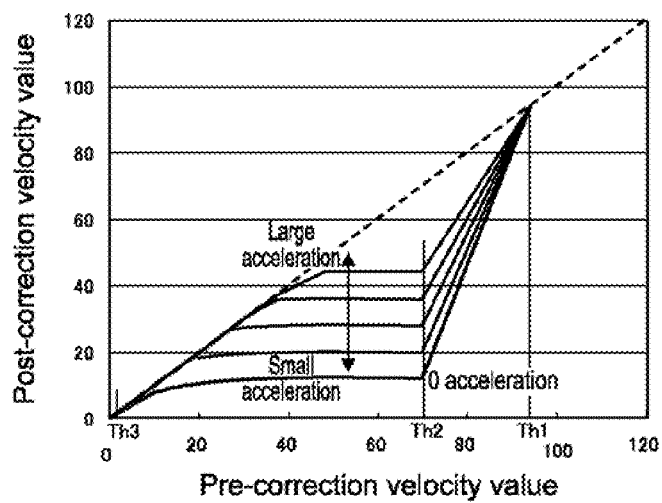
FIG. 17A is a graph showing a shake correction scale profile as characteristics of a filter used in this embodiment.

FIG. 17A is a graph showing the shake correction scale profile as characteristics of the filter 27 used in this embodiment. This graph is also a profile of a typical frequency within the shake frequency range (e.g., 10 Hz). In the filter 27, the profile is variable according to absolute values ($|a_{xi}|, |a_{yi}|$) of the acceleration values $(a_{xi}, a_{yi})$. The scale factor increases (approaches 1) as the acceleration value increases, and the scale factor decreases as the acceleration value decreases.

Figure 17B:
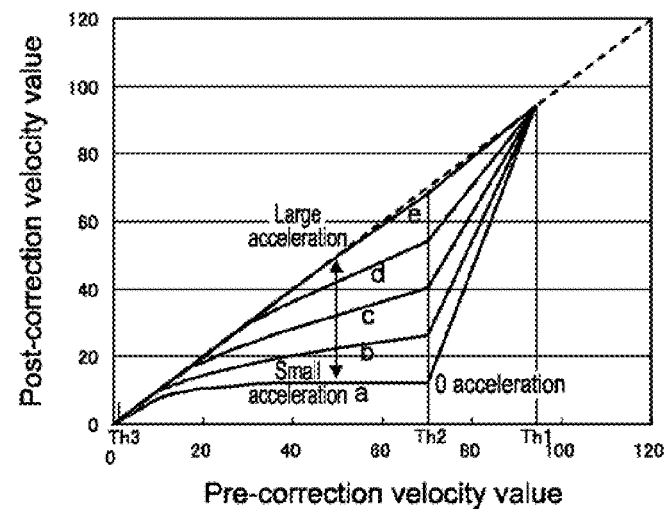
FIG. 17B is a graph showing an example where, as compared to FIG. 17A, a rate by which a scale factor decreases from a pre-correction velocity value of 0 to Th2 is lowered.
Figure 18A:
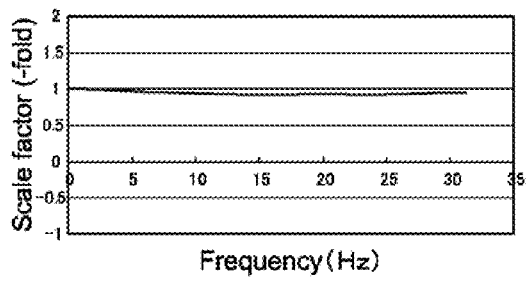
FIGS. 18A to 18E are graphs showing scale factor frequency characteristics respectively corresponding to the shake correction scale profiles a to e shown in FIG. 17B.
Figure 18B:
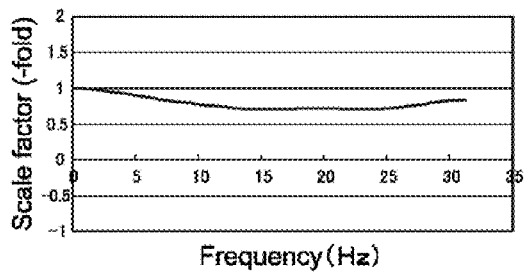
Figure 18C:
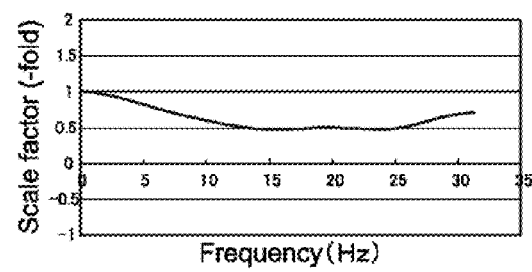
Figure 18D:
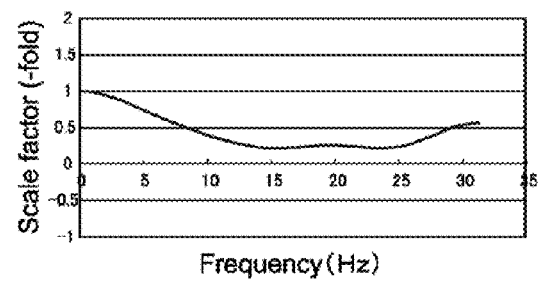
Figure 18E:
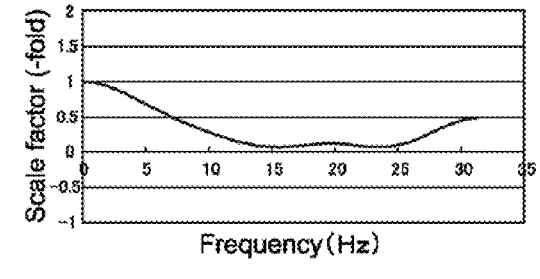

Alternatively, the shake correction scale profile of the filter 27 may be a graph as shown in FIG. 17B. In FIG. 17B, as compared to FIG. 17A, a rate by which the scale factor decreases from the pre-correction velocity value of 0 to Th2 and a rate by which the scale factor increases from Th2 to Th3 are lowered.

FIGS. 18A to 18E are graphs showing scale factor frequency characteristics respectively corresponding to the shake correction scale profiles a to e shown in FIG. 17B.

Let us go back to the description on FIG. 16. In Step 305, the control section 28 of the MPU 19 dynamically controls the scale factor of the filter 27 in accordance with the absolute values of the calculated acceleration values ($|a_{xi}|, |a_{yi}|$), that is, using the shake correction scale profiles of FIG. 17A or 17B. The scale factor control is typically carried out successively on the acceleration values. In other words, the scale factor is controlled by a predetermined operation that is based on the acceleration values.

However, it is also possible that information on the shake correction scale profile that corresponds to each of the acceleration values (or a predetermined range of accelerations) be stored in the memory 26 or the like in advance and the MPU 19 dynamically read out the information in accordance with the acceleration values. In this case, the number of shake correction scale profiles only needs to be two or more.

A process of Step 306 is the same as that of Step 204.

As described above, because the scale factor is controlled based on both the velocity values and the acceleration values in the operation shown in FIG. 16, an operational feeling for the user is improved. It is considered that the hand movement amount becomes smaller as the acceleration value increases. In other words, due to a correlation between the acceleration value and the hand movement amount, the operational feeling for the user can be improved by monitoring the acceleration value.

Figure 19:
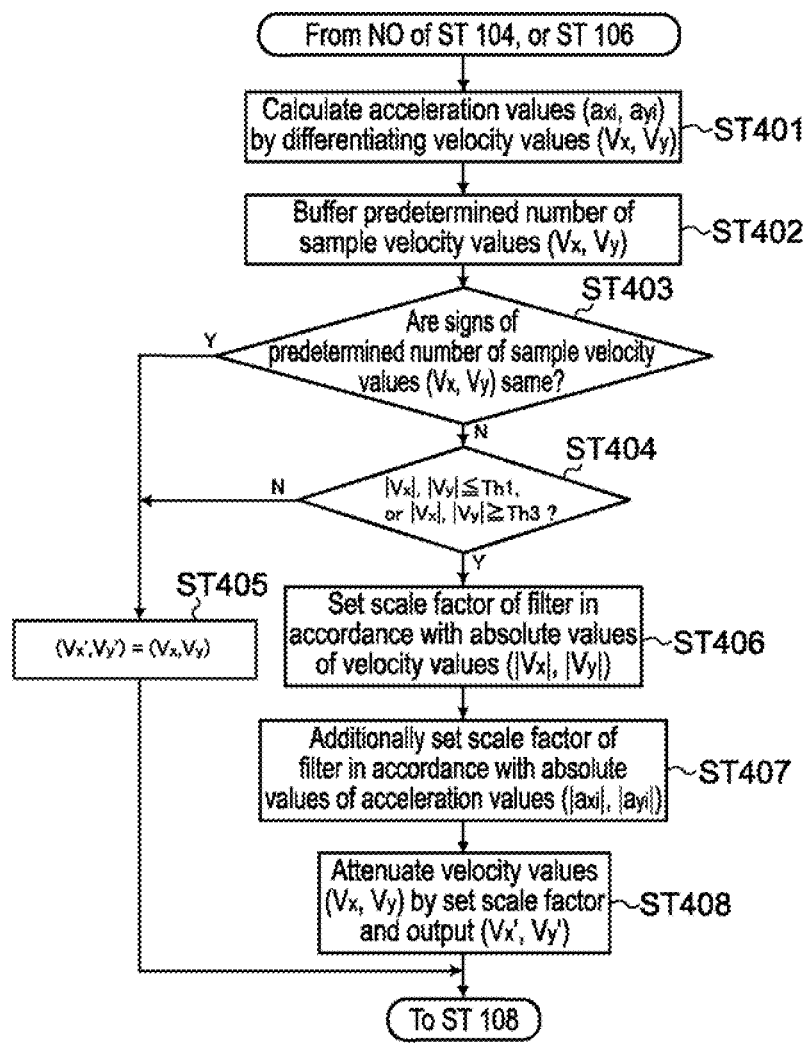
FIG. 19 is a flowchart showing an operation of the input apparatus according to still another embodiment.

FIG. 19 is a flowchart showing an operation of the input apparatus 1 according to still another embodiment.

A process of Step 401 is the same as that of Step 301 shown in FIG. 16.

In Step 402, the MPU 19 samples a predetermined number of temporally-consecutive velocity values $(V_x, V_y)$ calculated in Step 103 and stores them in the memory 26 (see FIG. 9). The number of samples of the velocity values to be stored in the memory 26 is set as appropriate. In this case, a ring buffer or a FIFO (First In First Out) is typically used for the memory 26, though not limited thereto.

The MPU 19 judges whether signs of the predetermined number of sampled velocity values that have been stored are the same judgment means) (Step 403). When the signs are the same, the MPU 19 advances to Step 405. The process of Step 405 is the same as that of Step 303. When the signs of the sampled velocity values are all the same, a velocity direction has not changed during a sampling period of the plurality of velocity values. Therefore, in this case, it can be considered that the user is in midst of moving the pointer from a certain position on the screen to a relatively-distant position. If the filter 27 exerts its function in this case, the user may feel awkwardness due to a phase delay. Therefore, it is only necessary that the function of attenuating the velocity values be stopped or weakened.

In a case where there are one or more sampled velocity values having different signs among the predetermined number of sampled velocity values stored in the memory 26, the MPU 19 advances to processes of Step 404 and subsequent steps. The processes of Steps 404 and 406 to 408 are the same as those of Steps 302 and 304 to 306 shown in FIG. 14. In other words, it can be considered that when one or more sampled velocity values having different signs are stored, the velocity direction has changed during the sampling period of the plurality of velocity values, meaning that a hand movement has occurred. Therefore, by executing the processes of Step 406 and subsequent steps, an influence of a hand movement can be removed.

The operation shown in FIG. 19 may be an operation in which the acceleration values are not calculated as in the operation shown in FIG. 15, that is, an operation without Steps 401, 404, and 407.

In FIG. 10, the input apparatus 1 has carried out the main operations to calculate the pointer velocity values ($V_x'$, $V_y'$). However, in an embodiment shown in FIG. 20, the control apparatus 40 carries out the main operations.

Figure 20:
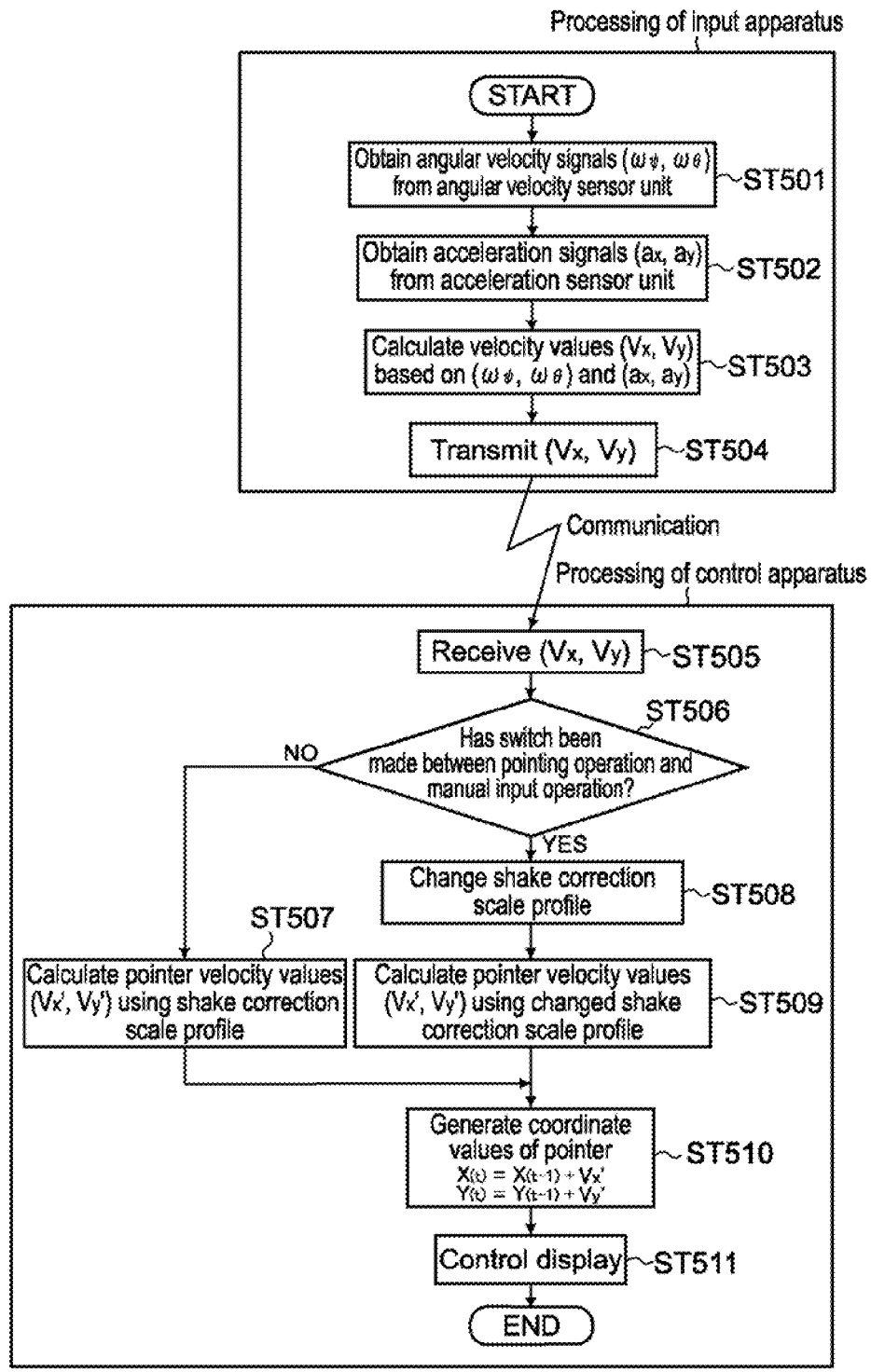
FIG. 20 is a flowchart of the control system in a case where a control apparatus carries out main operations.

As shown in FIG. 20, in Step 504, the MPU 19 of the input apparatus 1 transmits, to the control apparatus 40, information on the velocity values ($V_x$, $V_y$) calculated in Step 503. The MPU 35 of the control apparatus 40 receives the information on the velocity values ($V_x$, $V_y$) (Step 505) and executes the same processes as Steps 104 to 107 (Step 506 to 509). Processes of Steps 510 and 511 are the same as those of Steps 110 and 111.

Alternatively, in FIG. 10, it is also possible that the input apparatus 1 executes the processes up to Step 104 and the control apparatus 40 executes the processes of Step 105 and subsequent steps.

Alternatively, in FIG. 20, it is also possible for the MPU 19 of the input apparatus 1 to transmit, to the control apparatus 40, information on the angular velocity values and the acceleration values respectively calculated in Steps 501 and 502. The control apparatus 40 only needs to receive the information, calculate the velocity values ($V_x$, $V_y$) as in Step 503, and execute the processes of Step 506 and subsequent steps.

For the same purpose as in the processing shown in FIG. 20, in the processing shown in FIGS. 15, 16, and 19, the main operations may be carried out by the control apparatus 40.

Next, regarding a method of detecting a switch of the operation forms in Step 104 shown in FIG. 10, that is, a method of detecting which of the pointing operation form and the manual input operation form the operation form of the main body is, the following four detection methods will be described.

(First Detection Method)

In a first detection method, the user only needs to switch the operation form using a mechanical switch (not shown) such as a DIP switch or a dial switch provided to the input apparatus 1 or the control apparatus 40. When the switch is provided to the input apparatus 1, it is only necessary that the processing shown in FIGS. 10, 15, 16, and 19 be applied, for example. On the other hand, when the switch is provided to the control apparatus 40, it is only necessary that the processing shown in FIG. 20 by applied.

(Second Detection Method)

Figure 21:
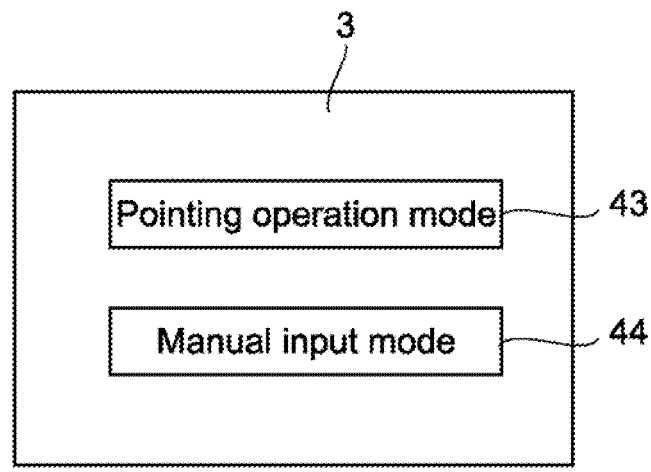
FIG. 21 is a diagram showing an example of a screen in a case where a GUI is used in detection of a switch between operation forms.

In a second detection method, it is only necessary to use a button switch constituted of a GUI as shown in FIG. 21, for example. Typically, the control apparatus 40 stores, in a storage device thereof, software for causing the button switch constituted of a GUI to exert its function. In the example shown in FIG. 21, for example, a button switch 43 for the pointing operation form and a button switch 44 for the manual input operation form are displayed on the screen 3.

Figure 22:
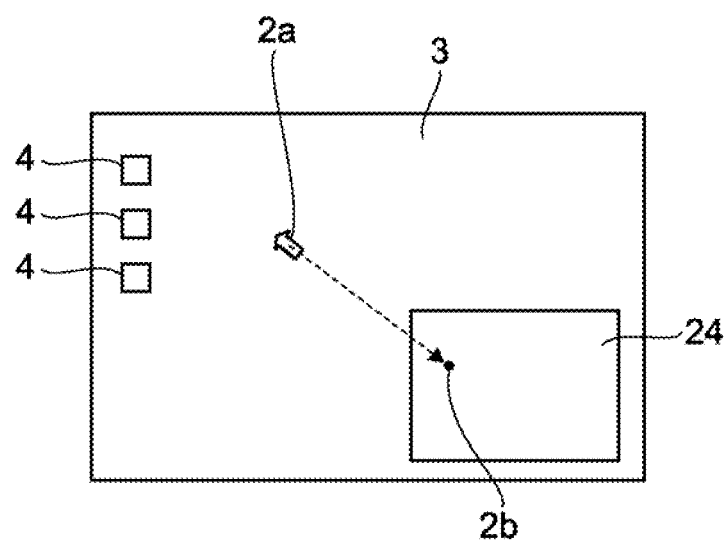
FIG. 22 is a diagram for illustrating another operation form detection method in the case where the GUI is used.

FIG. 22 is a diagram for illustrating another detection method in the case where the GUI is used. FIG. 22 is a diagram showing an example where an area where the user can perform a manual input is displayed on the screen 3 by a GUI. An area 24 on the screen 3 is an area where the manual input is executable. Areas other than the area 24 are a pointing operation area (first area). By the user moving a pointer 2a from the pointing operation area to the manual input area 24 by moving the main body 10, the MPU 35 of the control apparatus 40 detects a switch of the operation form. In a state where a UI 2b (pointer 2b) is placed inside the manual input area 24, the user is capable of writing letters and the like inside the manual input area 24. It is only necessary that well-known software be used for basic software for the manual input.

(Third Detection Method)

In a third detection method, it is only necessary that a time when the enter button 11 is pressed by the user and the MPU 19 or the MPU 35 detects an issuance of an enter code by the input apparatus 1 be set as a timing of detection of a switch of the operation form. With existing manual input software, the user carries out the manual input by moving a mouse while pressing an enter button. Also in this embodiment, a start of a drag operation in which the user moves the main body while pressing the enter button 11 becomes a trigger for the switch of the operation form. Accordingly, the existing manual input software that the user is used to using can be used as it is, resulting in a merit that no new mastery is required. In addition, the third detection method does not require additional hardware or the like for detecting the switch of the operation form.

In the third detection method, the operation form is switched to the manual input operation form also by a drag operation during a normal pointing operation instead of the manual input operation, like moving the icon 4 on the screen 3 while click-and-holding the icon 4. Therefore, because the shake correction function stops functioning during the drag operation in the normal pointing operation, there is a fear that it becomes difficult to perform a precise pointing operation. However, because the shake correction function functions since the user does not press the enter button 11 until immediately before clicking on the icon for the drag operation, there is no problem even when a precise pointing operation cannot be performed. Because the drag operation starts after the enter button 11 is pressed, precise pointing is unnecessary.

Furthermore, in the third detection method, even when the user presses the enter button 11 and an enter code is thus issued, the operation form is switched to the manual input operation form only at the time the enter code is issued. Therefore, because the operation form is switched to the pointing operation form when the user releases the enter button 11 immediately after the pressing thereof, the user can rarely recognize that the operation form is the manual input operation form at the instant when the enter code is issued.

For example, the switch of the enter button may be a switch constituted of an electrostatic pad equipped with a capacitance sensor, for example. In this case, the drag operation can be started when the user successively touches the electrostatic pad twice with his/her finger and leaving the finger on the electrostatic pad after the second touch. This can be applied to the manual input operation as described above and the judgment on the operation forms.

In the first to third detection methods, the control apparatus 40 may differentiate letters, figures, and shapes of icons displayed on the screen 3 so that the user can recognize which of the pointing operation form and the manual input operation form the current operation form is.

(Fourth Detection Method)

As a fourth detection method, there is a method of detecting a position of the main body 10 of the input apparatus 1. For example, a positional change between a time when the main body 10 is in the reference position or near-reference position as shown in FIGS. 7A and 7B and a time when the main body 10 is in the pen position as shown in FIG. 8 is large. The positional change can be recognized by the MPU 19 based on the acceleration values on the X axis and the Y axis detected by the acceleration sensor unit 16.

Figure 23:
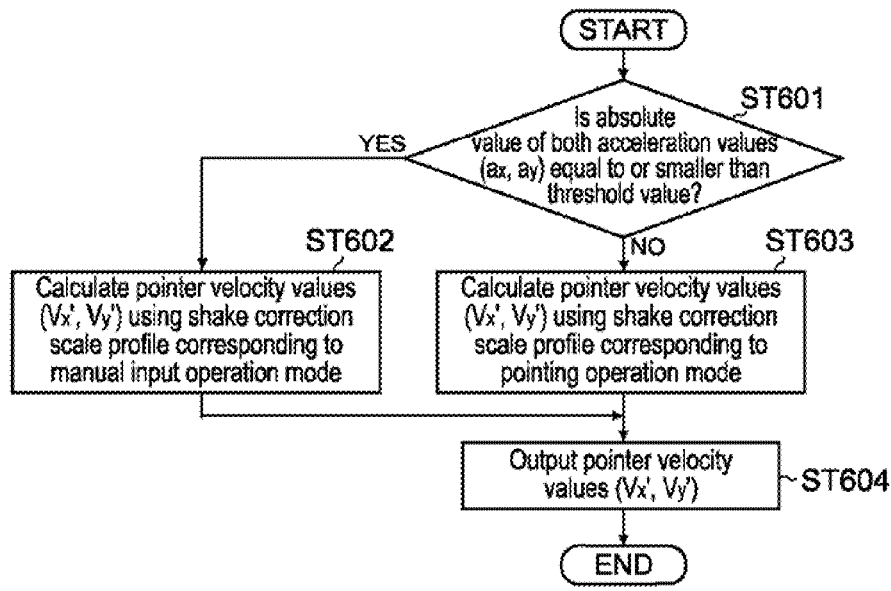
FIG. 23 is a flowchart showing a fourth detection method for a switch between a pointing operation form and a manual input operation form.

FIG. 23 is a flowchart showing the fourth detection method. The MPU 19 judges whether the absolute value of both of the acceleration values ($a_x$, $a_y$) obtained in Step 102 is equal to or smaller than a threshold value, for example (Step 601).

When the main body 10 is in the reference position, at least one of the absolute values of the acceleration values ($a_x$, $a_y$) exceeds the threshold value. This is apparent from the arrangement of the acceleration sensor unit 16 in the main body 10. When the main body 10 is in the pen position, an X'-Y' plane as a detection surface of the acceleration sensor unit 16 comes close to being a horizontal surface. Therefore, in this case, the acceleration values ($a_x$, $a_y$) of the acceleration sensor unit 16 become small values, and the main body 10 is judged as being in the pen position when the absolute value of both of the acceleration values ($a_x$, $a_y$) becomes equal to or smaller than the threshold value. Many users hold the main body 10 in the pen position such that a longitudinal direction of the main body 10 is slightly tilted toward the horizontal surface from the vertical direction, so a designer only needs to appropriately set the threshold value in consideration of the tilt.

When the absolute values of the acceleration values ($a_x$, $a_y$) are equal to or smaller than the threshold value in Step 601, the MPU 19 calculates the pointer velocity values using the profile c shown in FIG. 13, for example (Step 602). When at least one of the absolute values exceeds the threshold value, the operation form is the pointing operation form, and the MPU 19 uses a profile other than the profile c shown in FIG. 13, like the profile a or b or the variable profile shown in FIG. 17, to execute the shake correction processing, and calculates the pointer velocity values (Step 603). Then, the MPU 19 outputs the pointer velocity values (Step 604). Step 602 corresponds to Step 105 (or 107) shown in FIG. 10, and Step 603 corresponds to Step 107 (or 105) shown in FIG. 10.

Figure 24:
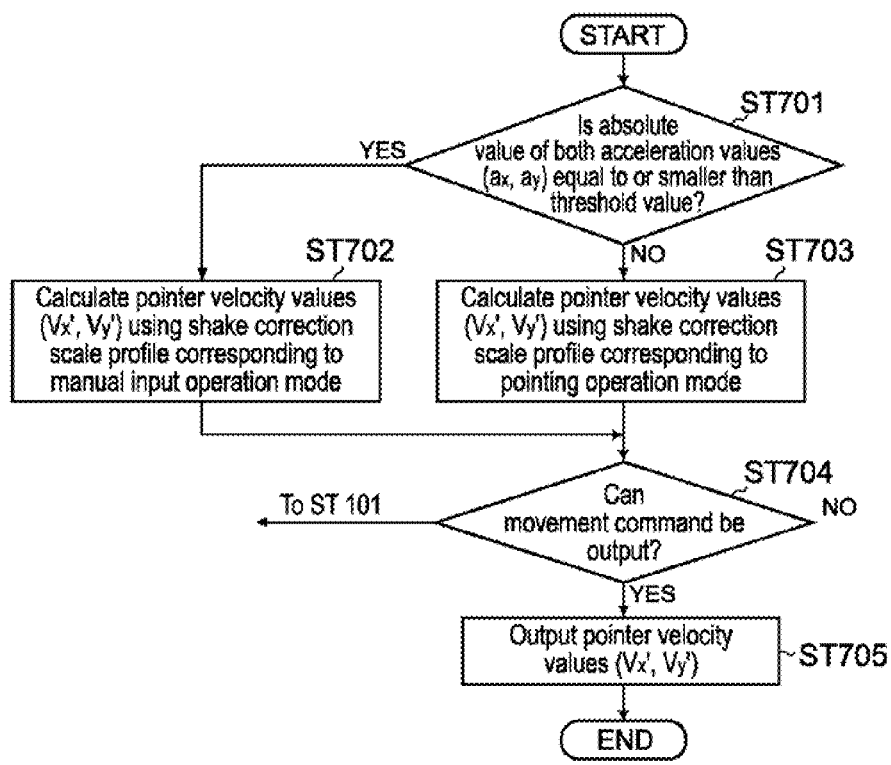
FIG. 24 is a flowchart showing another embodiment of the fourth detection method.

FIG. 24 is a flowchart showing another embodiment of the fourth detection method.

A difference between processing shown in FIG. 24 and the processing shown in FIG. 23 is Step 704. In the processing shown in FIG. 24, an input apparatus equipped with a main body including a 2-step-switch-type enter button (not shown) instead of the enter button 11 of the input apparatus 1 is used. The 2-step-switch type is as follows.

The MPU 19 outputs a movement command for moving the pointer 2 for the first time when the user presses the enter button a certain depth. Then, the MPU 19 outputs an enter command for the first time when the user additionally presses the enter button a certain depth (or releases the pressing) from the state where the movement command can be output. Therefore, the user can move the pointer 2 by moving the main body 10 while pressing the 2-step-switch-type enter button halfway.

Currently, a 2-step switch is typically applied to, for example, a digital camera. A so-called halfway pressing is established in a first step of the 2-step switch, and an enter command is generated by a full pressing in a second step after autofocus processing and the like is executed by the halfway pressing.

The 2-step switch is not limited to that including an electric-contact-type switch in both of the two steps. For example, a 2-step switch in which a switch constituted of an optical sensor is used for the first step so that a presence of a user's finger on the enter button can be detected by the optical sensor and an electric-contact-type switch for outputting an enter command is used for the second step may be used.

Referring back to FIG. 24, the MPU 19 judges in Step 704 whether an input signal has been input by the first-step switch, that is, whether the movement command can be output. If the movement command can be output, the MPU 19 outputs the pointer velocity values, and if not, returns to Step 101 shown in FIG. 10.

Steps 601 and 701 are not limited to the process of judging whether the absolute values of the acceleration values ($a_x$, $a_y$) are equal to or smaller than the threshold value. For example, the process may be a process of judging whether a combined vector amount of the acceleration values ($a_x$, $a_y$) is equal to or smaller than the threshold value.

In Steps 601 and 701 in FIGS. 23 and 24, respectively, the judgment has been made on whether the absolute values of the acceleration values ($a_x$, $a_y$) are equal to or smaller than the threshold value. However, in a case where the input apparatus includes a triaxial acceleration sensor unit (not shown) that is also capable of detecting a third acceleration value in the Z'-axis direction shown in FIGS. 5A and 5B, a judgment on the operation form can be made by monitoring the third acceleration value.

Typically, when the main body 10 is in the pen position, the acceleration value in the Z'-axis direction detected by the triaxial acceleration sensor unit is largely different from that obtained when the main body 10 is in the reference position. Therefore, in this case, the MPU 19 only needs to judge that the operation form is the manual input operation form when the acceleration value in the Z'-axis direction exceeds the threshold value. The threshold value in this case can also be set as appropriate by a designer.

Next, a description will be given on an embodiment in which the velocity values corrected by the shake correction scale profile are additionally corrected by a velocity correction scale profile, and pointer velocity values ($V_x''$, $V_y''$) obtained by the correction are output.

Figure 25:
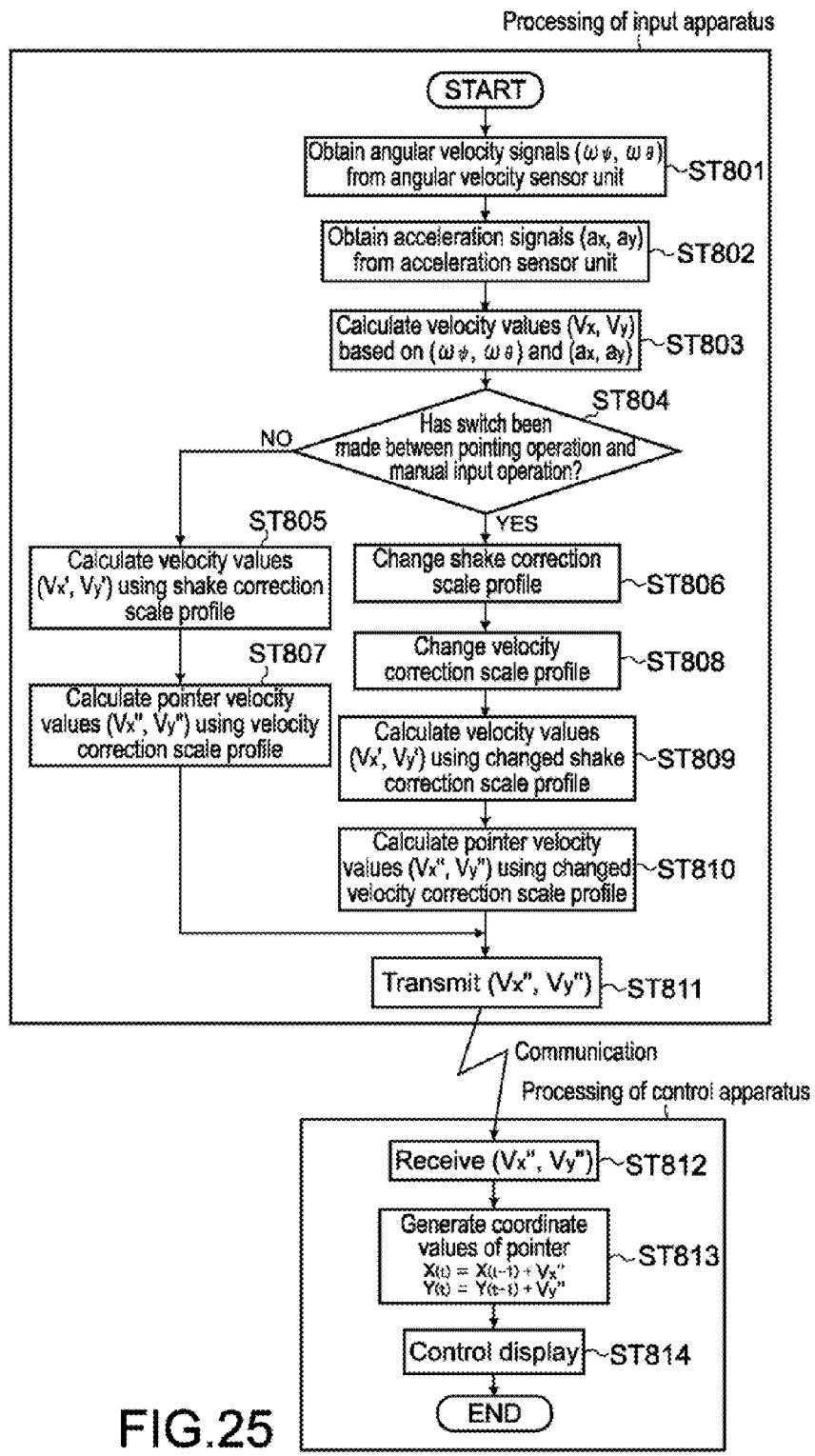
FIG. 25 is a flowchart showing a pointer velocity value calculation method that uses a velocity correction scale profile.

FIG. 25 is a flowchart showing a method of calculating pointer velocity values using the velocity correction scale profile described above.

Processes of Steps 801 to 807 are similar to those of Steps 101 to 107.

When the operation form is not switched between the pointing operation form and the manual input operation form (NO in Step 804), the MPU 19 executes the following process in Step 807. The MPU 19 corrects the velocity values ($V_x'$, $V_y'$) obtained in Step 805 by the velocity correction scale profile that has been used up to now, and calculates pointer velocity values ($V_x''$, $V_y''$). The MPU 19 transmits a movement command containing information on the pointer velocity values ($V_x''$, $V_y''$) to the control apparatus 40 (Step 811).

When the operation form is switched between the pointing operation form and the manual input operation form (YES in Step 804), the MPU 19 executes the following process in Step 808. As in Step 806, the MPU 19 changes the velocity correction scale profile (Step 808) and calculates the pointer velocity values ($V_x''$, $V_y''$) using the changed velocity correction scale profile. The MPU 19 transmits a movement command containing information on the pointer velocity values ($V_x''$, $V_y''$) to the control apparatus 40 (Step 811).

Processes of Steps 812 to 814 of the control apparatus 40 are similar to those of Steps 109 to 111.

Also in the flowchart shown in FIG. 25, for the same purpose as in the processing shown in FIG. 20, the control apparatus 40 may carry out the main operations. In this case, in FIG. 25, it is only necessary that the input apparatus 1 execute Steps 801 to 803 and the control apparatus 40 execute Steps 804 to 810, 813, and 814.

Figure 26:
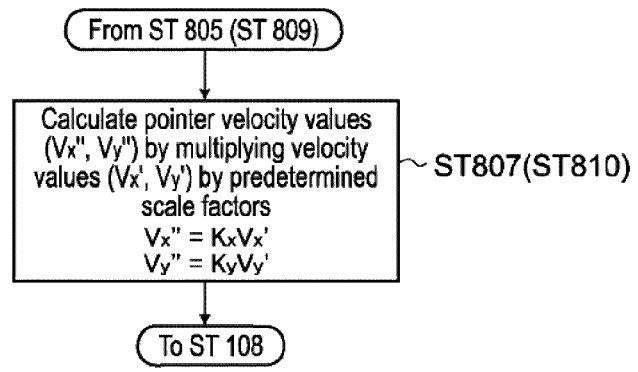
FIG. 26 is a flowchart showing processes of Steps 807 to 810.

FIG. 26 is a flowchart showing the processes of Steps 807 and 810. As shown in Equations (3) and (4) below, the MPU 19 calculates the pointer velocity values ($V_x''$, $V_y''$) by multiplying the calculated velocity values ($V_x'$, $V_y'$) by predetermined scale factor values ($K_x$, $K_y$).

$$V_x''=K_x*V_x' \quad (3)$$

$$V_y''=K_y*V_y' \quad (4)$$

Figure 27A:
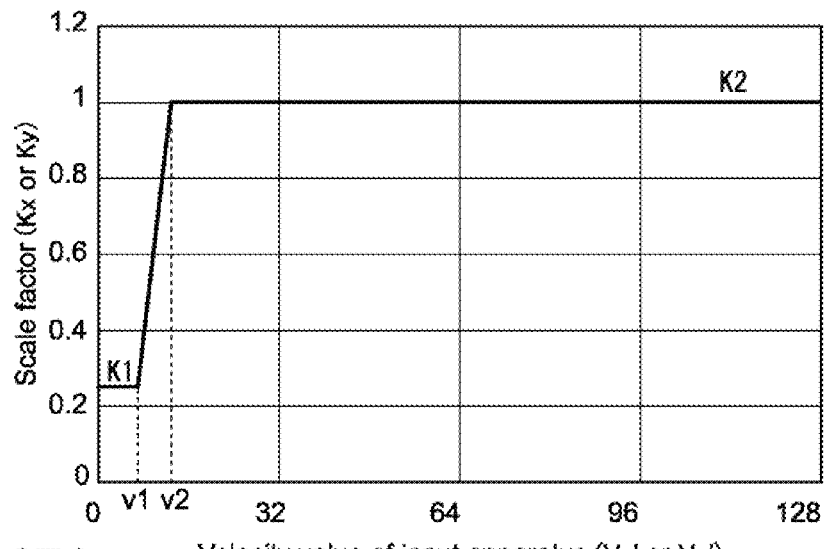
FIG. 27A is a graph showing a scale profile of a scale factor value $K_x$ and/or $K_y$, particularly a scale profile used in the pointing operation form.

FIG. 27A is a graph showing a scale profile of at least one of the scale factor values ($K_x$, $K_y$) of Equation(s) (3) and/or (4) above, particularly a scale profile used in the pointing operation form.

In FIG. 27A, the abscissa axis represents at least one of the velocity values ($V_x'$, $V_y'$), and the ordinate axis represents at least one of the scale factor values ($K_x$, $K_y$). In other words, at least one of the scale factor values ($K_x$, $K_y$) is a function of at least one of the velocity values ($V_x'$, $V_y'$).

In the example shown in FIG. 27A, the MPU 19 functions as a control means for variably controlling the scale factor value K in a range from a threshold value v1 to a threshold value v2 (first range) as a low-velocity range of the input apparatus 1, and controlling the scale factor value K to be constant in a range exceeding the threshold value v2 (second range).

When resolution performance of the velocity value on the abscissa axis is represented by an absolute value of ±128 (8 bits), the threshold value v1 is set to be 4 to 12 or 6 to 10, typically 8. Moreover, the threshold value v2 is set to be 10 to 20 or 12 to 16, typically 14. However, the threshold values v1 and v2 are not limited to those ranges and can be changed as appropriate. The resolution performance of the velocity value on the abscissa axis may be 8 bits or less or larger than 8 bits.

The velocity equal to or smaller than the threshold value v2 typically becomes 5 cm/s or less when converted into an actual velocity of the input apparatus 1, but can be changed as appropriate to, for example, 10 cm/s or less, 3 cm/s or less, or other ranges (e.g., 2 to 4 cm/s). As for a relatively-high-velocity range for the input apparatus 1 that exceeds 10 cm/s or 20 cm/s, for example, settings can also be changed as appropriate.

Figure 27B:
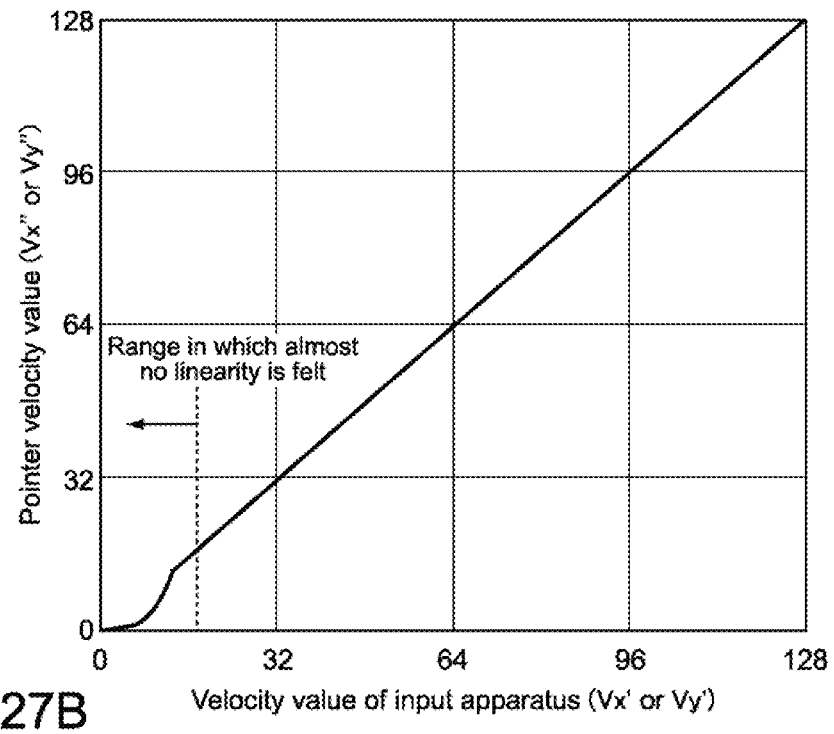
FIG. 27B is a graph showing a velocity correction scale profile obtained by the scale profile shown in FIG. 27A.

FIG. 27B is a graph showing the velocity correction scale profile described above, that is obtained by the scale profile shown in FIG. 27A. As in FIG. 27A, the abscissa axis represents at least one of the velocity values ($V_x'$, $V_y'$). The velocity correction scale profile shown in FIG. 27B is obtained by temporally differentiating the profile shown in FIG. 27A. The scale factor is a value with the velocity value $V_x'$ or $V_y'$ of the input apparatus 1 as an input and the pointer velocity value $V_x''$ or $V_y''$ as an output.

As shown in FIG. 27B, when the velocity value $V_x'$ or $V_y'$ of the input apparatus 1 is 0, the scale factor value K1 is set within, for example, 0.2 to 0.4, that is, the output/input is set within 0.2 to 0.4, though not limited thereto. The constant scale factor value K2 is set to 1, but may be set otherwise. This is because, if the scale factor value K2 is a constant value, the velocity values of the input apparatus 1 and the pointer velocity values will have a linear correspondence.

The MPU 19 only needs to store a function expressing the scale profile shown in FIG. 27A and a function expressing the velocity correction scale profile shown in FIG. 27B in the memory and use the functions to dynamically calculate the pointer velocity values. Alternatively, a lookup table generated based on the scale profile, the lookup table showing the correspondence between the velocity value $V_x'$ or $V_y'$ of the input apparatus 1 and the pointer velocity value, may be stored in the memory in advance.

As described above, when the velocity value $V_x'$ or $V_y'$ of the input apparatus 1 is equal to or smaller than the threshold value v2 as a relatively-low velocity range, the scale factor value K is controlled variably. For example, in this embodiment, when the velocity value of the input apparatus 1 is within the range of v1 to v2, the scale factor value K is set so as to increase as the velocity value $V_x'$ or $V_y'$ of the input apparatus 1 increases. Therefore, the user becomes capable of performing a precise pointing operation when the movement of the input apparatus 1 is within a relatively-low velocity range. Further, when the velocity value $V_x'$ or $V_y'$ of the input apparatus 1 is within a relatively-high velocity range that exceeds the threshold value v2, the scale factor value K is set to be constant. Therefore, when the velocity value $V_x'$ or $V_y'$ of the input apparatus 1 is within the relatively-high velocity range, the movement of the input apparatus 1 and that of the pointer 2 will have a linear correspondence, thus improving an operational feeling for the user.

To put it the other way around, when the velocity value $V_x'$ or $V_y'$ of the input apparatus 1 is within the relatively-low velocity range, even when the velocity correction scale profile is not linear, the user is almost incapable of distinguishing the linearity from nonlinearity. In other words, the range is typically 5 cm/s or less as described above.

Moreover, when the velocity value $V_x'$ or $V_y'$ of the input apparatus 1 is within the range from 0 to the threshold value v1, the MPU 19 controls the scale factor to be constant. Because the movement of the pointer 2 becomes linear in accordance with the operation at the time the movement of the input apparatus 1 is started (instant when the input apparatus 1 starts to move), the pointer 2 starts to move smoothly.

Here, regarding the way the scale factor value K increases in the range from the threshold value v1 to the threshold value v2, in the typical example of FIG. 27A, the scale factor value K increases linear-functionally. However, the present application is not limited thereto, and the scale factor value K may increase by a multi-degree function of a quadratic function or more, stepwise, by a combination of at least two of the above, or by various other ways. The multi-degree function of a quadratic function or more is of course not limited to a downwardly-convexed function, and an upwardly-convexed function or a combination of those is also possible. The case of the multi-degree function of a quadratic function or more will be described hereinbelow.

Figure 28:
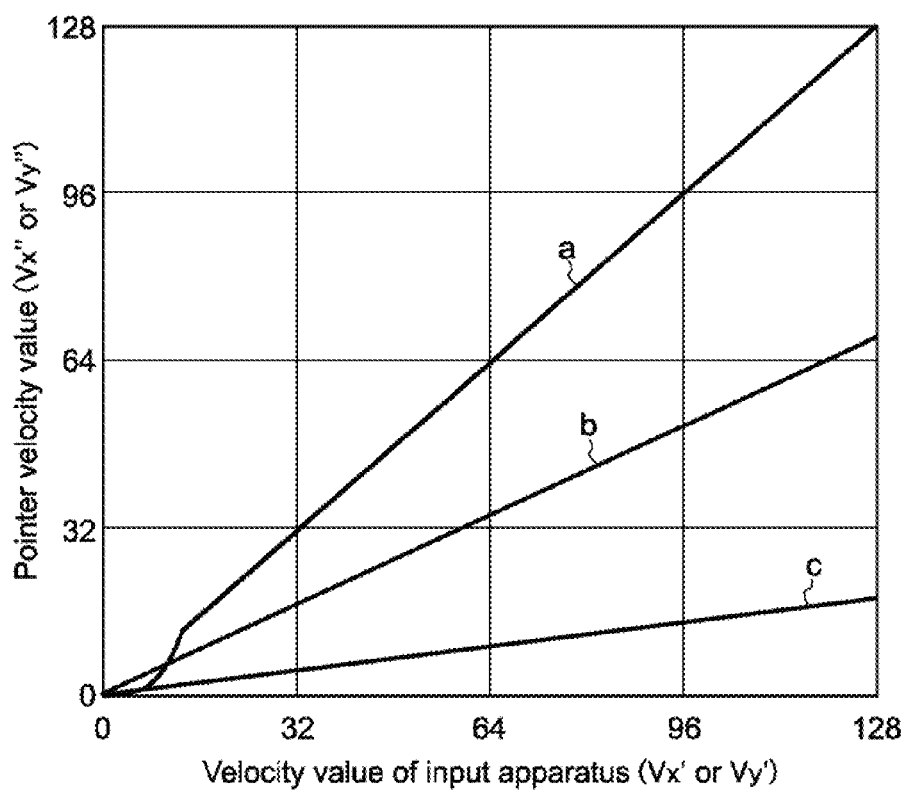
FIG. 28 is a graph showing an example of a plurality of velocity correction scale profiles.

The velocity correction scale profile set as described above is changed in Step 806 shown in FIG. 25 in accordance with the detection of the switch of the operation form. FIG. 28 is a graph showing an example of a plurality of velocity correction scale profiles. It is only necessary that function expressions expressing the plurality of velocity correction scale profiles be stored in the memory in advance or a lookup table generated based on the plurality of velocity correction scale profiles be stored in the memory in advance.

In the pointing operation form, a velocity correction scale profile a is used. In the manual input operation form, a linear velocity correction scale profile b or c is used. Accordingly, the pointer velocity values are calculated by the velocity correction scale profile that is suitable for the operation form, thus improving an operational feeling for the user.

Figure 29A:
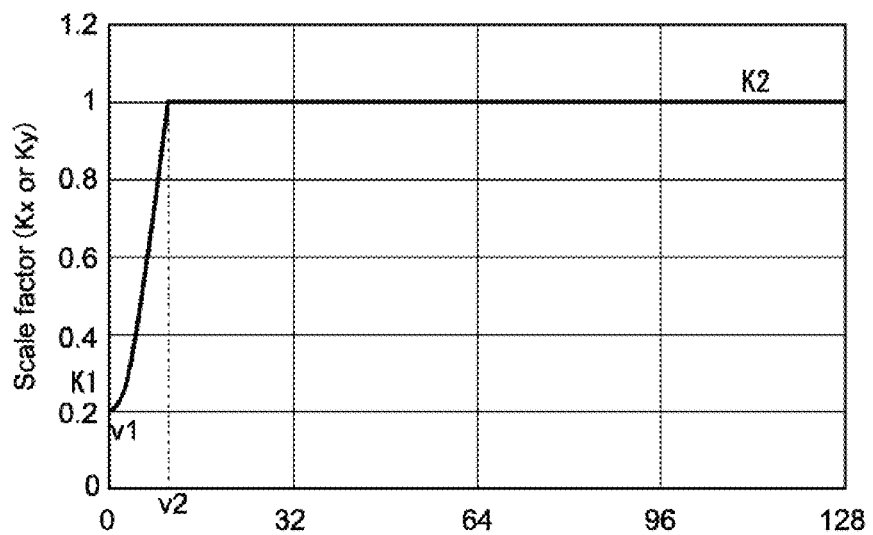
FIG. 29 are graphs showing scale profiles according to another embodiment.
Figure 29B:
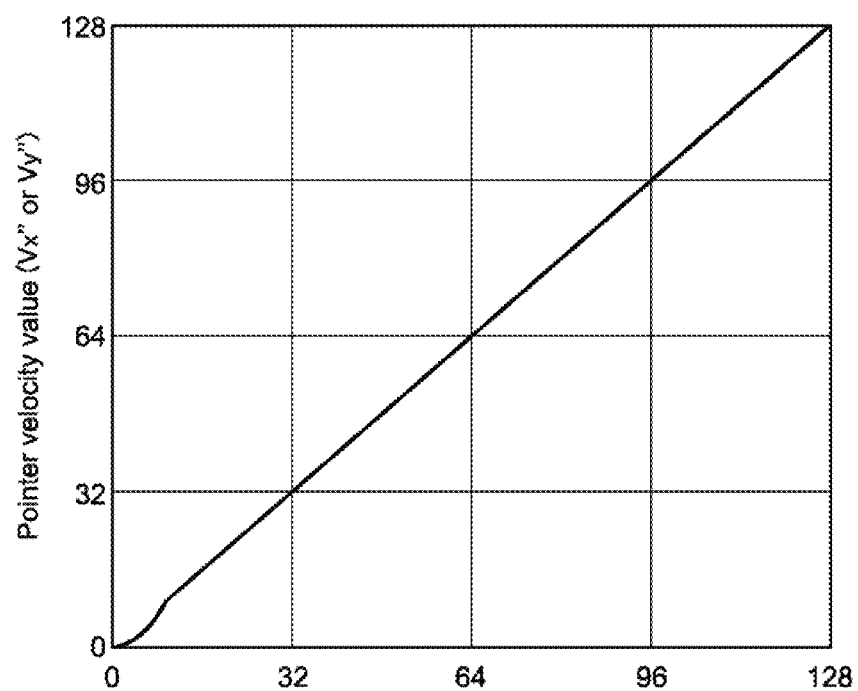

FIG. 29A is a graph showing a scale profile according to another embodiment. In this scale profile, the threshold value v1 shown in FIG. 27A is set to 0. Due to such a scale profile, a velocity correction scale profile shown in FIG. 29B increases smoothly from the velocity value 0 of the input apparatus 1. Accordingly, the user does not feel a stress in the low-velocity range.

In addition, in the scale profile shown in FIG. 29A, the function from v1 (=0) to v2 is a multi-degree function of a quadratic function or more. However, this part may be linear as shown in FIG. 27A.

Figure 30A:
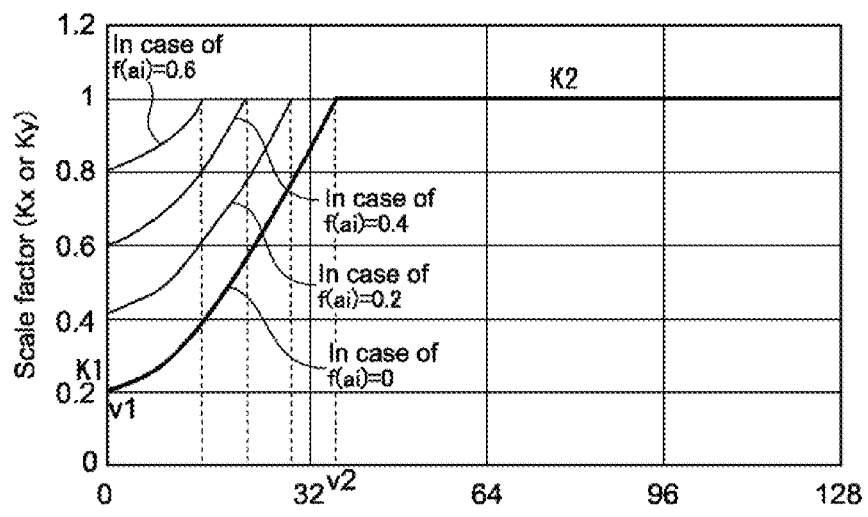
FIG. 30A is a graph showing a scale profile according to still another embodiment.
Figure 30B:
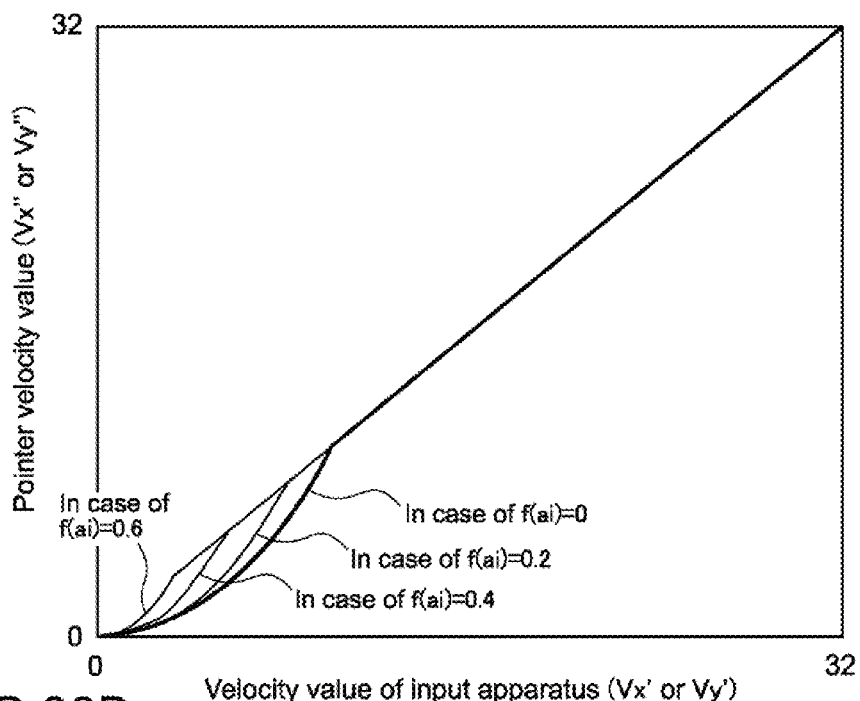
FIG. 30B is a graph showing a velocity profile obtained by the scale profile shown in FIG. 30A.

FIG. 30A is a graph showing a scale profile according to still another embodiment. FIG. 30B is a graph showing a velocity profile obtained by the scale profile shown in FIG. 30A.

In this example, the scale profile is set based on the acceleration value of the input apparatus 1. Within the range from the threshold value v1 (=0) to the threshold value v2, the larger the acceleration value of the input apparatus 1 is, the farther away the scale profile is from a scale profile at the very bottom indicated by a solid line so that the scale factor becomes closer to 1. In other words, the threshold value v2 shifts more to the low-velocity side as the acceleration value increases.

The threshold value v1 may be a value other than 0. The scale factor in the range from the threshold value v1 (=0) to the threshold value v2 increases by the multi-degree function of a quadratic function or more, but the scale factor may increase linearly.

The MPU 19 uses an operational value obtained based on the scale factor value K (basic scale factor value indicated by solid line) that is variable according to the velocity values ($V_x$, $V_y$) in the range from the threshold value v1 to the threshold value v2 and functions ($f(a_{xi})$, $f(a_{yi})$) of the acceleration values ($a_{xi}$, $a_{yi}$) obtained by differentiating the velocity values ($V_x$, $V_y$), to control the scale factor. The basic scale factor value indicated by the solid line in the range from the threshold value v1 to the threshold value v2 only needs to be stored in the memory in advance.

Hereinafter, the acceleration value $a_{xi}$ or $a_{yi}$ may simply be referred to as acceleration value $a_i$, and the function $f(a_{xi})$ or $f(a_{yi})$ may simply be referred to as function $f(a_i)$.

The function $f(a_i)$ is a function that increases as the acceleration value $a_i$ increases. The way the function increases may be by a linear function, a multi-degree function of a quadratic function or more, stepwise, by a combination of at least two of the above, or by various other ways. The function $f(a_i)$ only needs to be set while a balance is taken between awkwardness for the user in operating the input apparatus 1 at a high velocity and ease of a precise pointing operation through a user test, for example.

The operational value is a value obtained by adding the function $f(a_i)$ to the basic scale factor value K or multiplying the basic scale factor value K by the function $f(a_i)$. FIG. 30A shows a case where the operational value is obtained by adding the function $f(a_i)$ to the basic scale factor value K. Accordingly, the scale profile as shown in FIG. 30A can be obtained. Specifically, the scale factor value K approaches 1 (or a value close to 1) from the scale factor value indicated by the solid line as the acceleration value $a_i$ increases. In other words, the threshold value v2 shifts more to the low-velocity side as the acceleration value $a_i$ increases.

Figure 31A:
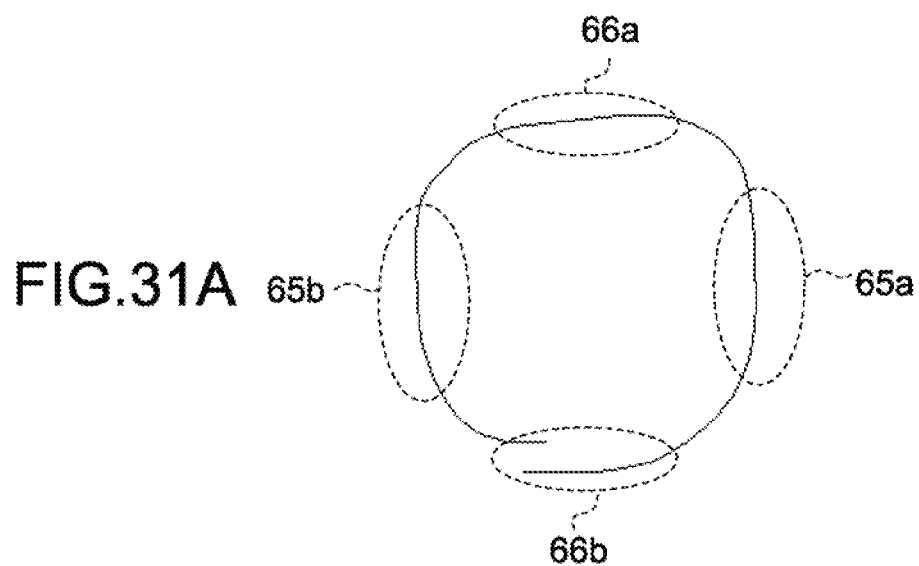
FIG. 31A is a diagram showing a circle drawn by the user through the manual input operation with the input apparatus, using the velocity correction scale profile shown in FIG. 27B.
Figure 31B:
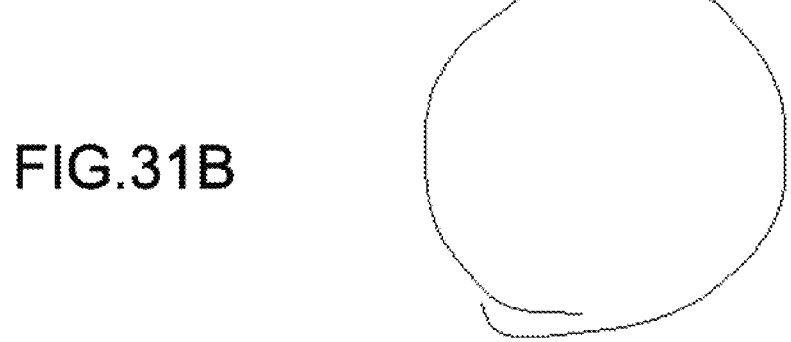
FIG. 31B is a diagram showing a circle drawn using the linear velocity correction scale profile c shown in FIG. 28, for example.

FIG. 31A is a diagram showing a circle drawn by the user through the manual input operation using the input apparatus 1 with the use of the velocity correction scale profile shown in FIG. 27B. FIG. 31B is a diagram showing a circle drawn using the linear velocity correction scale profile c shown in FIG. 28, for example.

With the velocity correction scale profile shown in FIG. 27B, in a low-velocity area of the main body 10, the pointer velocity value is converted into an additionally lower velocity value. Therefore, in areas 65a and 65b where the velocity of the main body 10 in the X-axis direction is low, it seems as though the movement of the pointer 2 in the Y-axis direction is facilitated. Moreover, in areas 66a and 66b where the velocity of the main body 10 in the Y-axis direction is low, it seems as though the movement of the pointer 2 in the X-axis direction is facilitated. Therefore, a distorted circle as shown in the figure is drawn. In contrast, in FIG. 31B, by using the linear velocity correction scale profile, an undistorted circle is drawn.

Next, an embodiment of a case where a plurality of users use the input apparatus 1 will be described.

Figure 32:
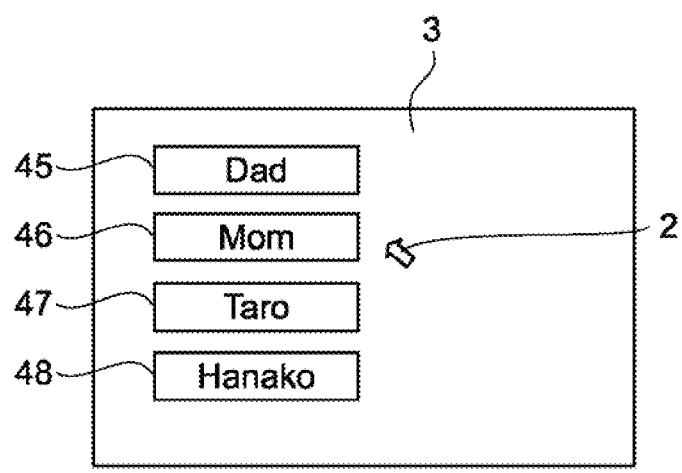
FIG. 32 is a diagram showing an example of a screen for authorizing a plurality of users that use the control system.

FIG. 32 is a diagram showing an example of the screen for authorizing the plurality of users using the control system 100.

The screen 3 is displayed on the display apparatus 5 under control of the control apparatus 40. On the screen 3, authorization buttons 45 to 48 are displayed. The authorization buttons 45 to 48 each correspond to identification information for identifying each of the plurality of users, and the control apparatus 40 or the input apparatus 1 stores the identification information and settings on the operation of the input apparatus 1 that the corresponding one of the plurality of users prefer in association with each other. In the example of FIG. 32, the authorization buttons 45 to 48 correspond to settings that the plurality of users constituting a family prefer.

Figure 33A:
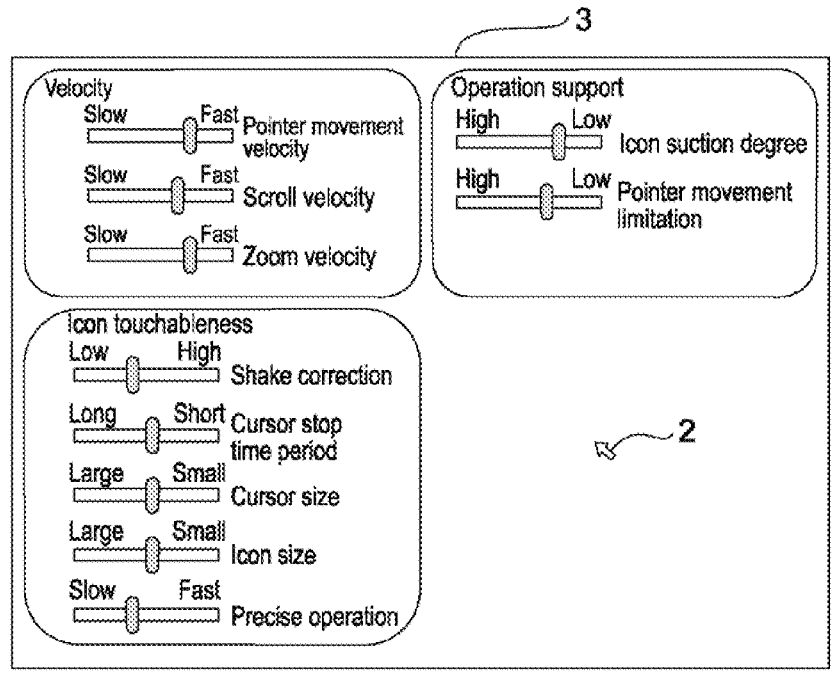
FIG. 33 are diagrams showing examples of screens showing setting adjustment parameters regarding an operation of the input apparatus.

FIG. 33A is a diagram showing an example of a screen showing setting adjustment parameters regarding the operation of the input apparatus 1. As shown in the figure, items for adjustments of, for example, a "pointer velocity", "operation support", and "icon touchableness" are displayed.

For example, the item of the "pointer velocity" includes parameters of a "pointer movement velocity", "scroll velocity", "zoom velocity", and the like.

For example, the adjustment of the "pointer movement velocity" means changing the velocity correction scale profile shown in FIGS. 27 and 28, for example, changing the constant scale factor, that is, changing a tilt of the linear part of the velocity correction scale profile or changing the threshold value v2 and/or the threshold value v1 shown in FIG. 27A, for example.

The item of the "operation support" includes, for example, parameters of an "icon suction degree", "pointer movement limitation", and the like. For example, the adjustment of the "icon suction degree" is as follows. For example, in a case where, in a predetermined area around the icon 4 on the screen 3, the scale factor of the velocity correction scale profile is set higher than that at a position distant from the icon 4, the adjustment of the "icon suction degree" includes adjusting a magnitude of the scale factor, adjusting a size of an area of the predetermined area, and the like.

The "pointer movement limitation" is, for example, an undetachable degree of the pointer 2 from a scroll bar for scrolling the screen in a predetermined direction and other GUIs. In other words, the undetachable degree of the pointer 2 with respect to the GUI increases as the "pointer movement limitation" becomes higher. A method of realizing the adjustment of the "pointer movement limitation" may be the same as that of the adjustment of the "icon suction degree".

The item of the "icon touchableness" includes, for example, parameters of a "shake correction intensity", "pointer stop time period", "pointer size", "icon size", "precise operation", and the like.

The adjustment of the "shake correction intensity" includes changing the shake correction scale profiles a to c shown in FIG. 13, changing a tilt of the shake correction scale profile c, changing the threshold value Th1, the threshold value Th2, and/or the threshold value Th3 shown in FIG. 11, changing a shape of the shake correction scale profile, and the like.

The "pointer stop time period" is a time period from when the user presses the enter button 11 of the input apparatus 1 and a signal thereof is thus input to the MPU 19 to when the MPU 19 outputs a movement command containing information on the velocity values of the main body 10 (or when the movement command is transmitted from the transceiver 21), and/or a time period required for the MPU 19 to output a movement command (or the movement command to be transmitted from the transceiver 21) since, after the user presses the enter button 11 and a signal thereof is thus input to the MPU 19, the user releases the enter button 11 and the input of the signal is thus canceled.

The operation signal input due to the pressing of the enter button 11 is an operation signal that is unrelated to the movement of the main body 10. However, in a case where the user operates the input apparatus 1 in the air, because a force of the user is applied to the main body 10 when the user presses or releases the enter button 11, there is a fear that the main body 10 moves accordingly. Specifically, if the main body 10 moves every time the user presses or releases the enter button 11, a drag operation is executed even when the user is not intending to do so. For preventing such a situation from occurring, the control system 100 executes control to stop the movement of the pointer 2 during a predetermined time period since the input of the operation signal unrelated to the movement of the main body 10 or a cancel thereof. The "pointer stop time period" is a parameter for adjusting the stop time period.

Figure 34:
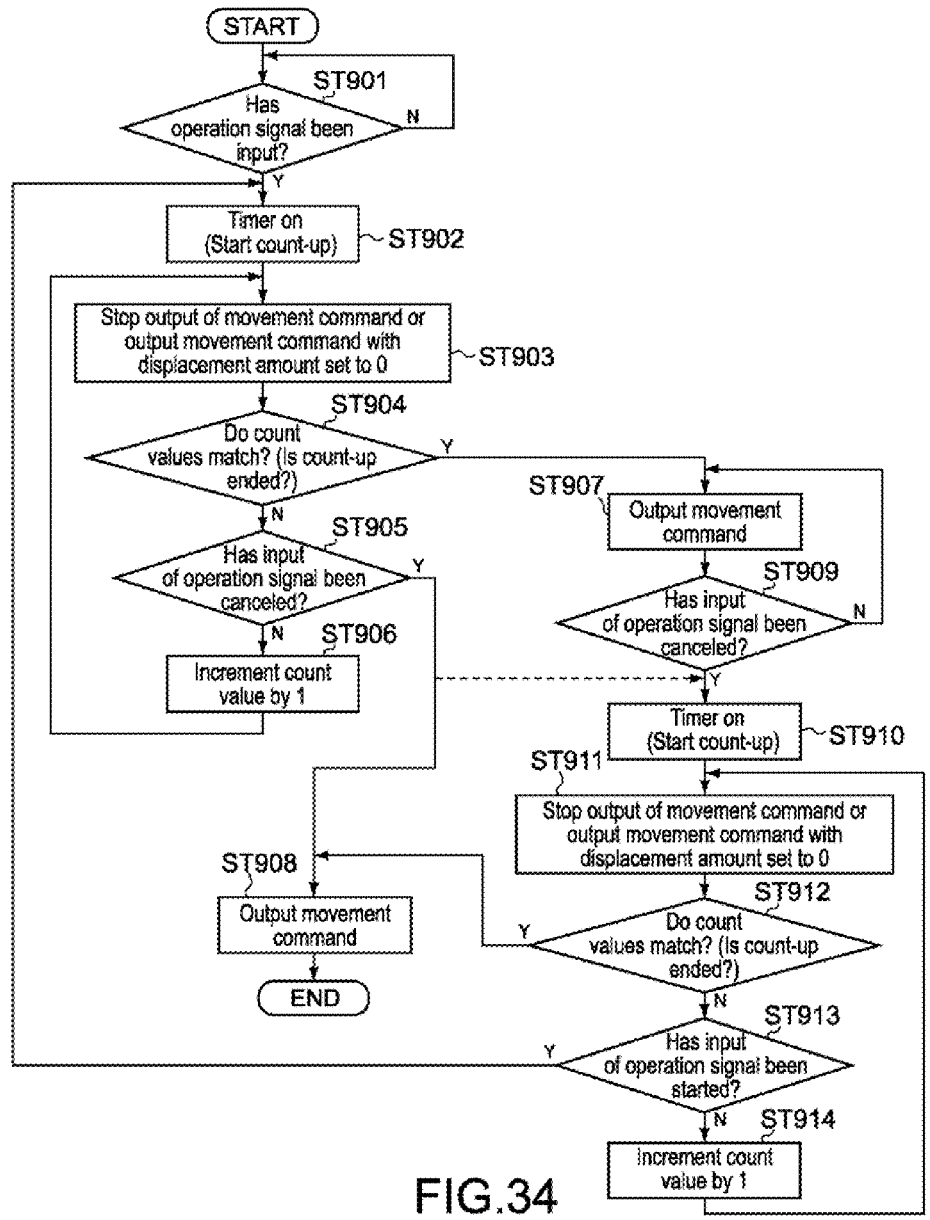
FIG. 34 is a flowchart showing an operation of the input apparatus for realizing processing for stopping the pointer a predetermined time period.

FIG. 34 is a flowchart showing an operation of the input apparatus 1 for realizing processing for stopping the pointer a predetermined time period.

Figure 35:
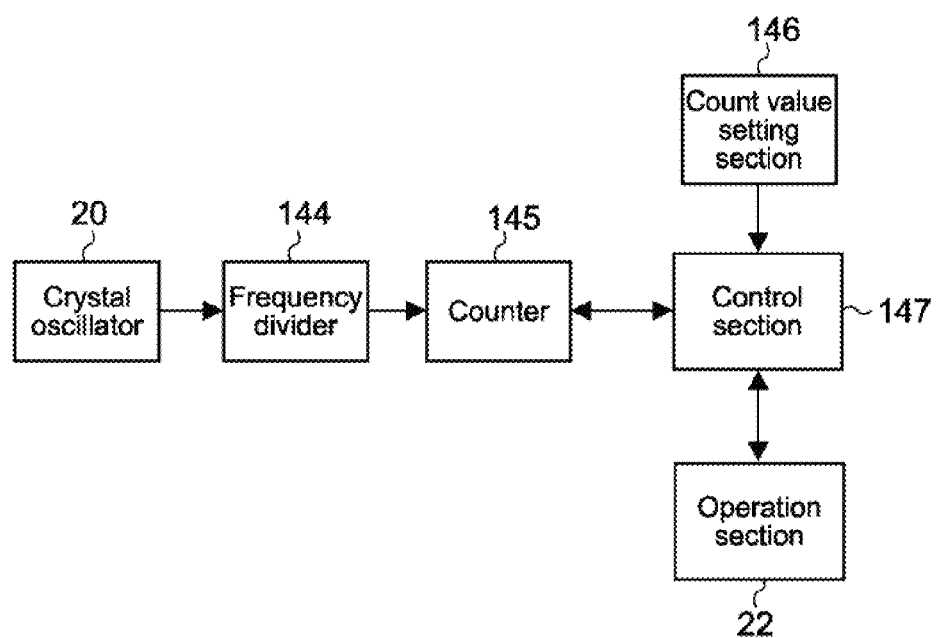
FIG. 35 is a functional block diagram of the input apparatus for realizing the operation shown in FIG. 34.

FIG. 35 is a functional block diagram of the input apparatus 1 for realizing the operation shown in FIG. 34. A frequency divider 144 generates clock pulses of a predetermined frequency based on pulses supplied from the crystal oscillator 20. A counter 145 counts the clock pulses generated by the frequency divider 144. A count value setting section 146 sets and stores a predetermined number of count values, for example. A control section 147 compares the count value supplied from the counter 145 and the count value supplied from the count value setting section 146 to execute processing to be described later based on a result of the comparison.

The blocks of the frequency divider 144, the counter 145, the count value setting section 146, the control section 147, and the like are typically included in the MPU 19, for example.

There are two types of count values to be set by the count value setting section 146. One is a count value corresponding to the time period during which the MPU 19 stops generating or transmitting the movement command for moving the pointer 2 on the screen 3 since the pressing of the enter button 11 by the user, that is, a start of an input of the operation signal. Hereinafter, this count value will be referred to as first count value.

The other is a count value corresponding to the time period during which the MPU 19 stops generating or transmitting the movement command since the release of the enter button 11 pressed by the user, that is, a cancel of the input of the operation signal. Hereinafter, this count value will be referred to as second count value.

The first count value and the second count value may either be different or the same. Typically, each of the first count value and the second count value corresponds to 0.2 sec, though not limited thereto. Alternatively, the user may be allowed to customize at least one of the first count value and the second count value.

Instead of generating or transmitting a movement command, it is also possible for the MPU 19 to output a signal of a movement command with the displacement amounts of the pointer 2 on the screen 3 set to 0, that is, a movement command with the velocity values reset to 0.

It should be noted that in generally-used PCs, an operation command is executed with the input of the operation signal input by the user via a button of a mouse, that is, a release of the pressed button as a trigger in many cases.

As shown in FIG. 34, when the button 11 is pressed by the user (YES in Step 901), the control section 147 turns on the timer (Step 902) and starts the count-up by the counter 145. Then, the MPU 19 stops outputting the movement command (Step 903) or continues outputting the movement command with the displacement amounts of the pointer 2 set to 0 within a time period corresponding to the first count value.

The control section 147 compares the first count value set in the count value setting section 146 and the count value supplied from the counter 145 (Step 904). In other words, when the count values match, the control section 147 ends the timer. When the count values differ, the control section 147 continues operating the timer and advance to Step 905. In Step 905, the MPU 19 monitors whether the pressed button 11 has been released, that is, whether the input of the operation signal has been canceled. When the pressed button 11 has not been released, the MPU 19 increments the count value by 1 (Step 906) and returns to Step 903.

The MPU 19 thus stops generating or transmitting the movement command while the timer is being operated, that is, until the count value supplied from the counter 145 and the first count value match. Alternatively, as described above, the MPU 19 may continue outputting a movement command with the displacement amounts of the pointer 2 on the screen 3 set to 0 within the time period corresponding to the first count value. By such processing, even when the main body 10 moves when the user inputs the operation signal via the button 11 and the sensor unit 17 detects that movement, the movement of the pointer 2 on the screen 3 is restricted. Therefore, unintentional operations of the pointer 2, the icons 4, and the like can be prevented from being made by the user.

When the timer is ended (YES in Step 904), the MPU 19 generates or transmits a movement command (Step 907). In this case, the pointer 2 moves on the screen 3 in accordance with the movement of the input apparatus 1. In Step 907, the input of the operation signal is not yet canceled and the user is moving the input apparatus 1 while pressing the button 11.

When the input of the operation signal is canceled even while the timer is operating (YES in Step 905), the MPU 19 generates or transmits a movement command as in Step 907 (Step 908).

From the state of Step 907, the MPU 19 monitors whether the pressed button 11 has been released, that is, whether the input of the operation signal has been canceled (Step 909). When the button 11 has been released, the control section 147 turns on the timer again (Step 910) and starts the count-up by the counter 145. Then, the MPU 19 stops the output of the movement command (Step 911) or continues outputting the movement command with the displacement amounts of the pointer 2 set to 0 within the time period corresponding to the second count value.

When the second count value set in the count value setting section 146 and the count value supplied from the counter 145 match (YES in Step 912), the control section 147 ends the timer. When the timer is ended, the MPU 19 moves the pointer 2 by outputting the movement command (Step 908). By such processing, even when the main body 10 moves when the user press-and-releases the button 11 and the sensor unit 17 detects that movement, the movement of the pointer 2 on the screen 3 is restricted. Therefore, unintentional operations of the pointer 2, the icons 4, and the like can be prevented from being made by the user.

When the time is not yet ended (NO in Step 912), that is, the count values differ, the MPU 19 continues to operate the timer and advances to Step 913. In Step 913, the MPU 19 monitors whether the released button 11 is pressed again, that is, whether the input of the operation signal is started again. When the button 11 is not pressed, the MPU 19 increments the count value by 1 (Step 914) and returns to Step 911.

When the input of the operation signal is started even while the timer is operating (YES in Step 913), the MPU 19 returns to Step 902 and starts the timer. Accordingly, control of the pointer 2 and the icons 4 can be performed without the user feeling any awkwardness.

Here, in FIG. 34, after the input of the operation signal is canceled in Step 905, the control section 147 may reset the timer of Step 904 to restart the timer as indicated by the broken line, and advance to the processes of Step 910 and subsequent steps. Accordingly, control of the pointer 2 and the icons 4 can be performed without the user feeling any awkwardness.

The processing shown in FIG. 34 may be executed by the control apparatus 40. In this case, the control apparatus 40 receives the acceleration signals and angular velocity signals transmitted from the input apparatus 1 and also an operation signal input via the operation section 22. Then, the control apparatus 40 generates a first control signal corresponding to the displacement amounts of the pointer 2, the displacement amounts corresponding to the detection signals, and a second control signal corresponding to the operation signal input by the user via the operation section 22. In actuality, the first control signal generated by the control apparatus 40 is a control signal that is based on coordinate information of the pointer 2. In addition, the second control signal generated by the control apparatus 40 is a control signal for executing various types of predetermined processing that correspond to the operation signals input via the operation section 22 of the input apparatus 1.

Figure 33B:
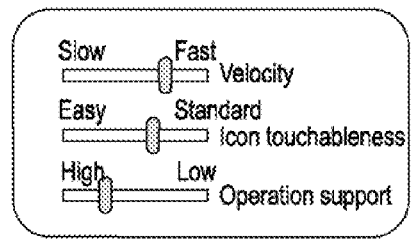
Figure 33C:
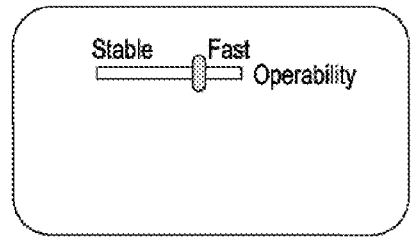

Let us go back to the description on FIG. 33. When there are many setting parameters shown in FIG. 33A and the user finds it a burden, it is possible to display a simple parameter setting screen shown in FIGS. 33B and 33C. For example, in FIG. 33C, the closer the "operability" is to "stable", the lower the "pointer movement velocity", the "scroll velocity", and the like that are shown in FIG. 33A become. Further, the degree of parameters of the "operation support" also becomes lower.

As described above, the control apparatus 40 stores the identification information corresponding to the authorization buttons 45 to 48 and the setting information shown in FIG. 33 in association with each other, and includes a program that uses the corresponding setting (changes settings) when any one of the authorization buttons 45 to 48 is selected. It is also possible for the input apparatus 1 to include this program.

Accordingly, control of the pointer 2 that matches an operational sense of each user can be realized.

Once the setting information is changed, the input apparatus 1 uses the setting to control the movement of the pointer 2 or the control apparatus 40 uses the setting to control the movement of the pointer 2.

Figure 36:
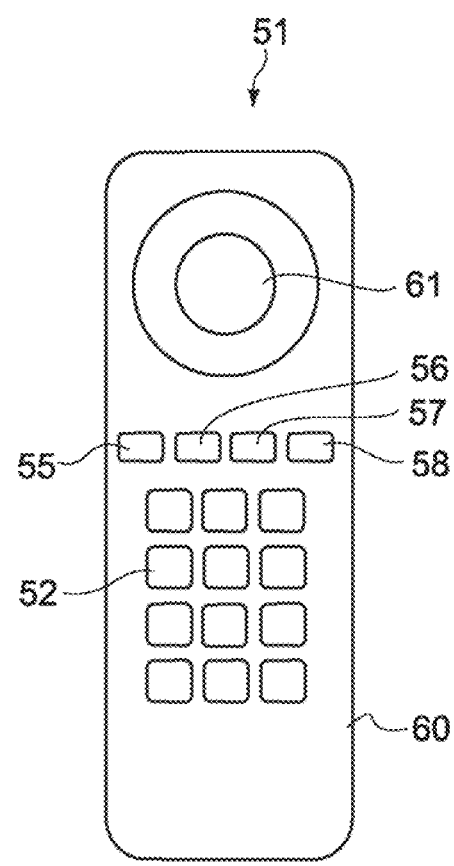
FIG. 36 is a schematic diagram showing an input apparatus in which functions of authorization buttons are allocated to physical buttons on the input apparatus.
Figure 37:
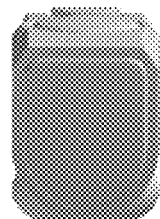
FIG. 37 is a front view of an input apparatus (pointing device) according to still another embodiment.
Figure 38:
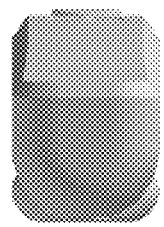
FIG. 38 is a back view of the input apparatus shown in FIG. 37.
Figure 39:
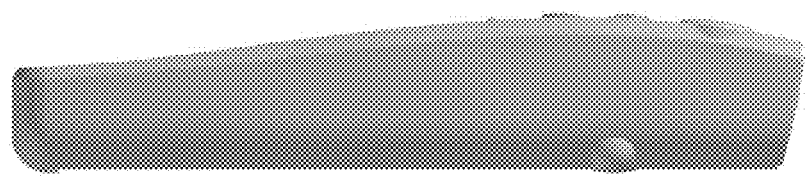
FIG. 39 is a right-hand side view of the input apparatus shown in FIG. 37.
Figure 40:
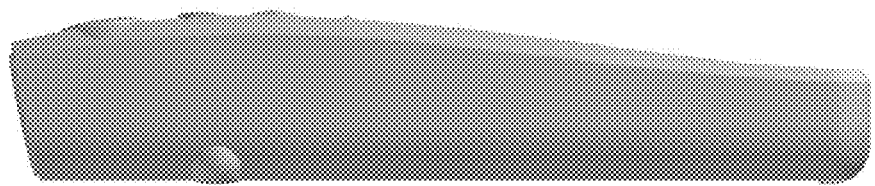
FIG. 40 is a left-hand side view of the input apparatus shown in FIG. 37.
Figure 41:
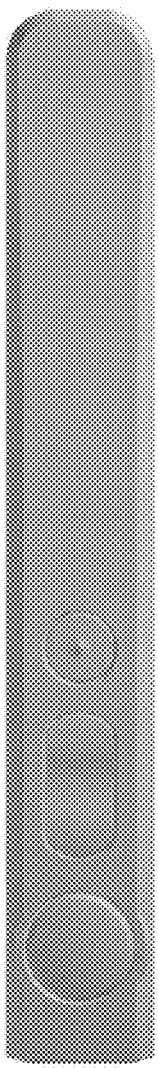
FIG. 41 is a plan view of the input apparatus shown in FIG. 37.
Figure 42:
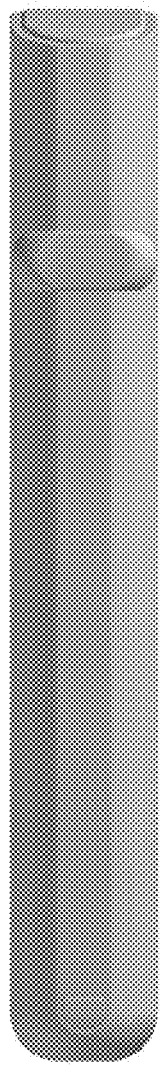
FIG. 42 is a bottom view of the input apparatus shown in FIG. 37.
Figure 43:
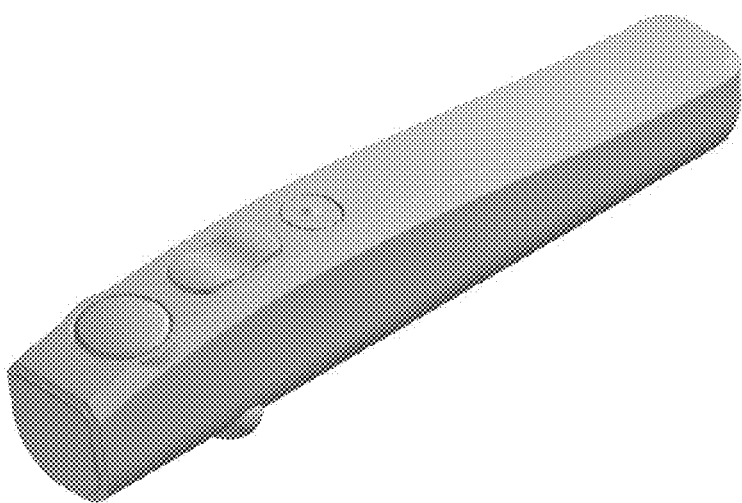
FIG. 43 is a perspective diagram (reference diagram) in which an upper surface and a front surface of the input apparatus shown in FIG. 37 are shown at the front.
Figure 44:
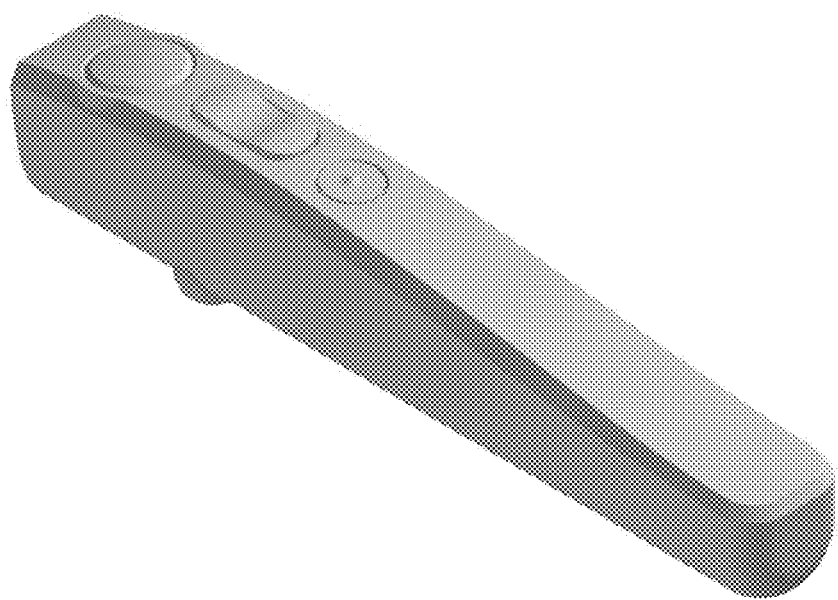
FIG. 44 is a perspective diagram (reference diagram) in which the upper surface and a back surface of the input apparatus shown in FIG. 37 are shown at the front.
Figure 45:
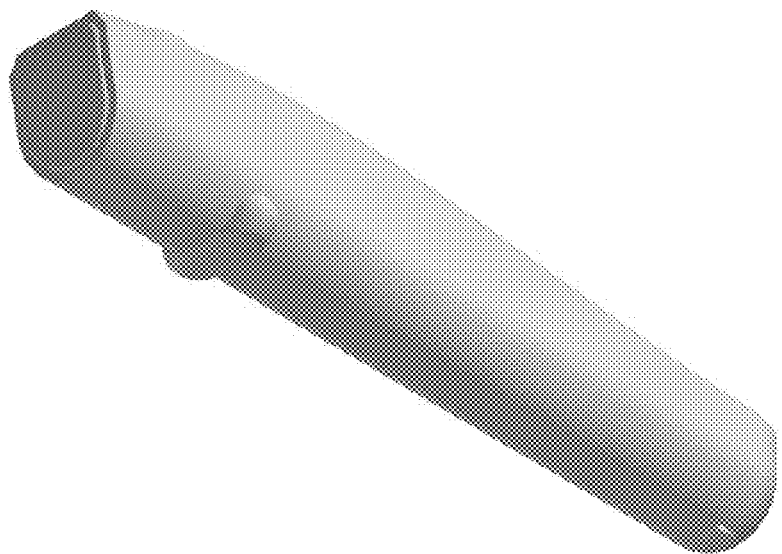
FIG. 45 is a perspective diagram (reference diagram) in which a bottom surface and the front surface of the input apparatus shown in FIG. 37 are shown at the front.
Figure 46:
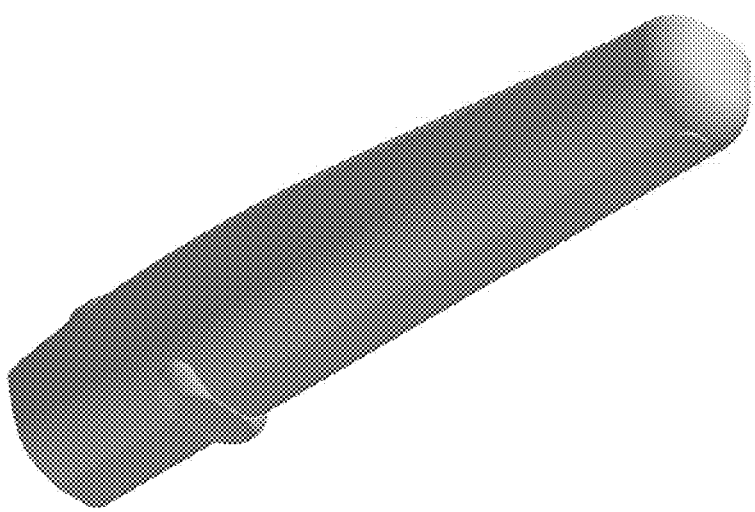
FIG. 46 is a perspective diagram (reference diagram) in which the bottom surface and the back surface of the input apparatus shown in FIG. 37 are shown at the front.

FIG. 36 is a schematic diagram showing an input apparatus in which functions of the authorization buttons 45 to 48 are allocated to physical operation buttons of the input apparatus.

For example, a main body 60 of an input apparatus 51 is provided with an enter button 61, authorization buttons 55 to 58 for a plurality of users, and other operation buttons 52. In the main body 60, the sensor unit 17 shown in FIGS. 5A and 5B is provided. The input apparatus 51 is also used as a remote controller for operating, for example, a TV and other AV equipment. The plurality of operation buttons 52 are buttons for selecting channels of a TV, for example. For example, user authorization may be executed by an input through one of the plurality of operation buttons 52 or a combination of inputs through two or more operation buttons 52.

The functions of the authorization buttons 55 to 58 are the same as those of the authorization buttons 45 to 48 shown in FIG. 32. In other words, identification information of the plurality of users is allocated to the corresponding one of the authorization buttons 55 to 58, and the input apparatus 1 includes a program that uses the settings corresponding to the selected identification information. Because the input apparatus 51 includes such a program, even when a control apparatus different from the control apparatus 40 that the user ordinarily uses is used, the control apparatus can be operated with an operational feeling that suits the user.

The program may of course be included in the control apparatus 40. In this case, when any one of the authorization buttons 55 to 58 is pressed, the input apparatus 1 only needs to transmit the identification information corresponding to the pressed authorization button to the control apparatus 40, for example. The control apparatus 40 receives the identification information and changes the setting information. In this case, the control apparatus 40 receives the velocity values ($V_x$, $V_y$) and executes the adjustment processing using various adjustment parameters shown in FIG. 33, for example.

After the user is authorized, the control apparatus 40 may display, by the GUI, a command group corresponding to the identification information of the user, such as a menu screen and selectable items preferred by the authorized user.

It should be noted that in the examples shown in FIGS. 32 and 36, the setting information regarding the operation of the input apparatus 1 before the user inputs the identification information by selecting one of the authorization buttons 45 to 48 (55 to 58) only needs to be a default setting or setting corresponding to one piece of identification information selected prior to the input.

In addition to the authorization method using the authorization buttons 45 to 48 and 55 to 58, the users may be authorized by a method as follows. For example, a user is authorized when a specific gesture of the user made with the input apparatus 1 matches or is close to gesture information stored in advance in the input apparatus 1 or the control apparatus 40. Typically, the gesture information is information on the movement of the main body 10 that the user has registered in advance, for example. The input apparatus 1 or the control apparatus 40 only needs to include software for generating information on the movement of the main body 10 at a time of registering user settings using the sensor unit 17, for example. The user is authorized when the movement of the main body 10 made by the user at the time of authorization matches or is similar to that of the main body 10 registered in advance. The movement of the main body 10 is a movement of swinging the main body 10 a predetermined number of times, a movement of the user signing his/her own autograph, other movements of writing/drawing letters and figures, and the like.

FIGS. 37 to 46 show an input apparatus (pointing device or remote controller) according to still another embodiment.

In the flowchart shown in FIG. 25, the velocity values ($V_x'$, $V_y'$) have been calculated using the shake correction scale profile and the pointer velocity values ($V_x''$, $V_y''$) have been calculated using the velocity correction scale profile. However, processing that carries out velocity correction processing without carrying out the shake correction processing is also possible, for example. In this case, the processes of Steps 805, 806, and 809 are omitted from the flow shown in FIG. 25.

The input apparatuses 1 and 51 according to the above embodiments have transmitted input information to the control apparatus wirelessly. However, the input information may be transmitted by wire.

In the above embodiments, the pointer 2 that moves on the screen in accordance with the movement of the input apparatuses 1 and 51 has been represented as an image of an arrow. However, the image of the pointer 2 is not limited to the arrow and may be a simple circle, square, or the like, or a character image or any other images.

The detection axes of each of the angular velocity sensor unit 15 and the acceleration sensor unit 16 of the sensor unit 17 do not necessarily need to be mutually orthogonal like the X' axis and the Y' axis described above. In this case, the accelerations respectively projected in the mutually-orthogonal axial directions can be obtained by a calculation that uses a trigonometric function. Similarly, the angular velocities about the mutually-orthogonal axes can be obtained by a calculation that uses the trigonometric function.

Instead of the angular velocity sensor unit 15, an angle sensor or an angular acceleration sensor may be used. Examples of the angle sensor include a geomagnetic sensor and an image sensor. When triaxial geomagnetic sensors are used, for example, since change amounts of angle values are detected, angular velocity values can be calculated by differentiating the angle values. The angular acceleration sensor is constituted as a combination of a plurality of acceleration sensors, and angular velocity values can be calculated by integrating angular acceleration values obtained by the angular acceleration sensors.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An input apparatus, comprising:
   a main body;
   a movement detection means for detecting a movement of the main body;
   a velocity-related value calculation means for calculating a velocity-related value that is related to a velocity of the detected movement of the main body;
   an output means for attenuating an output value of a predetermined frequency range out of an output value as the calculated velocity-related value by a scale factor of a scale profile set in accordance with the velocity-related value, and outputting the attenuated output value as a corresponding movement value that corresponds to a movement of a pointer on a screen;
   a storage means for storing a plurality of pieces of identification information for identifying a plurality of users and information on the scale profile set for each of the plurality of pieces of identification information in association with each other; and
   an output control means for controlling the output means to output, when one of the plurality of pieces of identification information is selected by a manual input of one of the plurality of users, the corresponding movement value based on the information on the scale profile that corresponds to the selected identification information out of the plurality of pieces of information on the scale profile.

2. The input apparatus according to claim 1,
   wherein the storage means stores, as information on a gesture operation that corresponds to the movement of the main body, at least one piece of identification information out of the plurality of pieces of identification information.

3. A control apparatus controlling a movement of a pointer on a screen based on an output value as a velocity-related value output from an input apparatus including a main body, a movement detection means for detecting a movement of the main body, and a velocity-related value calculation means for calculating the velocity-related value that is related to a velocity of the detected movement of the main body, the control apparatus comprising:
   a reception means for receiving the output value that has been output;
   an output means for attenuating an output value of a predetermined frequency range out of the received output value as the velocity-related value by a scale factor of a scale profile set in accordance with the velocity-related value, and outputting the attenuated output value as a corresponding movement value that corresponds to the movement of the pointer on the screen;
   a storage means for storing a plurality of pieces of identification information for identifying a plurality of users and information on the scale profile set for each of the plurality of pieces of identification information in association with each other; and
   an output control means for controlling the output means to output, when one of the plurality of pieces of identification information is selected by a manual input of one of the plurality of users, the corresponding movement value based on the information on the scale profile corresponding to the selected identification information out of the plurality of pieces of information on the scale profile.

4. A control method, comprising:
   detecting a movement of a main body of an input apparatus;
   calculating a velocity-related value that is related to a velocity of the detected movement of the main body;
   attenuating, by an output means, an output value of a predetermined frequency range out of an output value as the calculated velocity-related value by a scale factor of a scale profile set in accordance with the velocity-related value, and outputting the attenuated output value as a corresponding movement value that corresponds to a movement of a pointer on a screen;
   storing a plurality of pieces of identification information for identifying a plurality of users and information on the scale profile set for each of the plurality of pieces of identification information in association with each other; and controlling the output means to output, when one of the plurality of pieces of identification information is selected by a manual input of one of the plurality of users, the corresponding movement value based on the information on the scale profile corresponding to the selected identification information out of the plurality of pieces of information on the scale profile.

5. An input apparatus, comprising:
a main body;
a movement detection means for detecting a movement of the main body;
an operation section operated by a user;
an output means for outputting a movement command for moving a pointer on a screen, that corresponds to the detected movement of the main body, and outputting, when input with an operation signal that is unrelated to the movement of the main body by an operation to the operation section, an operation command corresponding to the input operation signal;
a stop means for stopping the movement of the pointer on the screen during a predetermined stop time period since one of the input of the operation signal and a cancel of the input of the operation signal;
a storage means for storing a plurality of pieces of identification information for identifying a plurality of users and information on the stop time period set for each of the plurality of pieces of identification information in association with each other; and
a time control means for controlling, when one of the plurality of pieces of identification information is selected by a manual input of one of the plurality of users, a time period during which the stop means stops the movement of the pointer, based on the information on the stop time period corresponding to the selected identification information out of the plurality of pieces of information on the stop time period.

6. A control apparatus for controlling a movement of a pointer on a screen based on at least a movement command and an operation signal, the control apparatus comprising:
a reception means for receiving at least the movement command and the operation signal output from an input apparatus including a main body, a movement detection means for detecting a movement of the main body, an operation section operated by a user, and an output means for outputting a movement command for moving the pointer on the screen, that corresponds to the detected movement of the main body, an operation command when input with an operation signal that is unrelated to the movement of the main body by an operation to the operation section, the operation command corresponding to the input operation signal, and the operation signal;
a coordinate value generation means for generating coordinate values of the pointer on the screen in accordance with the received movement command;
a stop means for stopping the movement of the pointer on the screen during a predetermined stop time period since one of the reception of the operation signal and a cancel of the reception of the operation signal;
a storage means for storing a plurality of pieces of identification information for identifying a plurality of users and information on the stop time period set for each of the plurality of pieces of identification information in association with each other; and
a time control means for controlling, when one of the plurality of pieces of identification information is selected by a manual input of one of the plurality of users, a time period during which the stop means stops the movement of the pointer, based on the information on the stop time period corresponding to the selected identification information out of the plurality of pieces of information on the stop time period.

7. A control method, comprising:
detecting a movement of a main body of an input apparatus;
outputting, by the input apparatus, a movement command for moving a pointer on a screen, that corresponds to the detected movement of the main body;
outputting, when the input apparatus is input with an operation signal that is unrelated to the movement of the main body by an operation to an operation section that is provided to the input apparatus and operated by a user, an operation command corresponding to the input operation signal;
stopping the movement of the pointer on the screen during a predetermined stop time period since one of the input of the operation signal and a cancel of the input of the operation signal;
storing a plurality of pieces of identification information for identifying a plurality of users and information on the stop time period set for each of the plurality of pieces of identification information in association with each other; and
controlling, when one of the plurality of pieces of identification information is selected by a manual input of one of the plurality of users, a time period during which the movement of the pointer is stopped, based on the information on the stop time period corresponding to the selected identification information out of the plurality of pieces of information on the stop time period.

* * * * *